United States Patent

Furui et al.

[11] Patent Number: 5,142,685
[45] Date of Patent: Aug. 25, 1992

[54] PIPELINE CIRCUIT FOR TIMING ADJUSTMENT OF IRREGULAR VALID AND INVALID DATA

[75] Inventors: Toshiyuki Furui; Yoshifumi Fujiwara, both of Tokyo; Akira Ishizuka, Yamanashi, all of Japan

[73] Assignee: NEC Corporation, Tokyo, Japan

[21] Appl. No.: 351,084

[22] Filed: May 12, 1989

[30] Foreign Application Priority Data

May 20, 1988 [JP] Japan .................. 63-123548
May 20, 1988 [JP] Japan .................. 63-123549
May 20, 1988 [JP] Japan .................. 63-123550

[51] Int. Cl.⁵ ............................... G06F 13/14
[52] U.S. Cl. .............. 395/800; 364/DIG. 1; 364/231.8; 364/270; 364/266.3; 395/375
[58] Field of Search ... 364/200 MS File, 900 MS File; 395/375, 800

[56] References Cited

U.S. PATENT DOCUMENTS

| | | | |
|---|---|---|---|
| 4,189,767 | 2/1980 | Ahuja | 364/200 |
| 4,371,927 | 2/1983 | Wilhite et al. | 364/200 |
| 4,553,203 | 11/1985 | Rau et al. | 364/200 |
| 4,574,345 | 3/1986 | Konesky | 364/200 |
| 4,725,973 | 2/1988 | Matsuura et al. | 364/900 |
| 4,736,336 | 4/1988 | Girard | 364/900 |
| 4,779,073 | 10/1988 | Iketani | 341/55 |
| 4,782,441 | 11/1988 | Inagami et al. | 364/200 |
| 4,783,783 | 11/1988 | Nagai et al. | 364/200 |
| 4,802,120 | 1/1989 | McCoy | 364/900 |

Primary Examiner—Thomas C. Lee
Assistant Examiner—Mehmet Geckil
Attorney, Agent, or Firm—Foley & Lardner

[57] ABSTRACT

A pipeline circuit is capable of adjusting the timing of data, in a data processing system for ensuring processing, even if the input timings of different data are irregular or the input data are invalid. This is achieved by generating a selection signal, which is input to a data holding circuit. The selection signal determines the particular register in which a datum is stored. The value of the selection signal is determined by an input indicating signal, which indicates whether a particular datum is valid or invalid. When the data is valid the selection signal is shifted to the next value, indicating the next higher register, and when the data is invalid the selection signal maintains the value it had for the previous datum.

12 Claims, 21 Drawing Sheets

FIG.6

PIPELINE CIRCUIT FOR TIMING ADJUSTMENT OF IRREGULAR VALID AND INVALID DATA

BACKGROUND OF THE INVENTION

The present invention relates to a pipeline circuit for adjusting the data timing in a data processing system.

Usually, a timing-adjusting pipeline circuit is used for adjusting the timing of data transfers between processing units, particularly for adjusting the timing of data transfers to an interleave type processing unit from another processing unit.

An interleave type processing unit in this context typically is a memory unit consisting of a plurality of banks which are used in a time-share manner. Another example of interleave type processing unit is an arithmetic system comprising a plurality of low-speed arithmetic units which are used in a time-share manner to let the whole system achieve high-speed arithmetic operation.

In an actual data processing system, in order that data, which is to be written into memory, match the interleave timing as input data to an interleave type processing unit, some kind of timing adjustment is required.

A conceivable method of timing adjustment is to adjust the actuating timing of a data processing instruction so that the processed data reach the input crossbar at the interleave timing referred to above. This method necessitates no particular timing adjuster. However, it entails complex control of the instruction actuating timing, and thereby affects the processing start times of processing units other than the memory and may deteriorate the overall performance of the data processing system.

Therefore, a timing-adjusting circuit should be provided immediately before the input crossbar.

If a serial data $A = (a_1, a_2, \ldots, a_m)$ are inputted, the output timing of the first datum a is adjusted with a selection signal S. The output timing of the succeeding data $a_2, a_3, \ldots$ (inputs to the interleave type processing unit) are controlled so as to be identical with the interleave timing by maintaining the selection signal S at the time the datum $a_i$ is outputted. Such a circuit cannot be used when, for instance, the input timings of different data are irregular, as is the case with the output data of a processing unit whose processing time differs with the value of each datum. Also, such a circuit cannot be used when the series of data include invalid ones that cannot be processed with an interleave type processing unit, such as data for masked vector processing.

SUMMARY OF THE INVENTION

An object of the present invention is, therefore, to provide a pipeline circuit for timing adjustment designed to send out at proper timings only data effective for ensuing processings, even if the input timings of different data are irregular or some of the input data are invalid.

In order to achieve the above objective, a first pipeline circuit according to the invention comprises:

a selection signal generating circuit for outputting a selection signal $S_j$ indicating the value next to the preceding selection signal $S_{j-1}$ out of n periodic values 1, 2, ..., n, 1, 2, ... when an input indicating signal $T_j$ entered corresponding to one datum $A_j$ out of a series of m input data $A_1, A_2, \ldots, A_m$, indicates invalidity, and a selection signal $S_j$ indicating the same value as that indicated by the selection signal $S_{j-1}$, when the input indicating signal $T_j$ indicates validity, and a data holding circuit responsive to the selection signal $S_j$ generated by said selection signal generating circuit corresponding to said datum $A_j$ for inputting, when the value indicated by the selecting signal $S_j$ is i, the datum $A_j$ to data holding means $R_i$, the i-th among n stages of data holding means $R_1, R_2, \ldots, R_n$ and for outputting, via $n-i$ stages of data holding means $R_{i+1}, R_{i+2}, \ldots, R_n$, the datum $A_j$, $n-i+1$ timing cycles later than the inputting of the datum $A_j$; where said m data $A_1, A_2, \ldots, A_j, \ldots, A_m$ and said m input indicating signals $T_1, T_2, \ldots, T_j, \ldots, T_m$ are entered and valid data among the m data are successively outputted at $n \times k + 1$ (k is an integer timing cycles.

The selection signal generating circuit for generating selection signals, to determine the durations of data holding by the data holding circuit, is controlled with input indicating signals $T_1, T_2, \ldots, T_j, \ldots, T_m$ indicating the validity or invalidity of the input data $A_1, A_2, \ldots, A_j, \ldots, A_m$. If the input indicating signals $T_1, T_2, \ldots, T_j, \ldots, T_m$ consecutively indicate validity, the selection signal will retain its value for the first input datum. However, if an input indicating signal $T_j$ indicating invalidity is inputted midway, the selection signal will change to its next value. This operation makes it possible, even if the input timings of different data are irregular or some of the input data are invalid, to send out at the proper timings only effective data for the ensuing processings.

In order to achieve the above object, a second pipeline circuit according to the present invention comprises:

a selection signal generating circuit for outputting, a selection signal $S_j$ indicating the value next to the preceding selection signal $S_{j-1}$ out of n periodic values 1, 2, ..., n, 1, 2, ... when an input indicating signal $T_j$ entered, corresponding to one datum $A_j$ out of a series of m input data $A_1, A_2, \ldots, A_m$, indicates invalidity, and, a selection signal $S_j$ indicating the same value as that indicated by the selection signal $S_{j-1}$, when the input indicating signal $T_j$ indicates validity, and a data holding circuit, having as inputs said datum $A_j$, said selection signal $S_j$ corresponding to said datum $A_j$ and said input indicating signal $T_j$, for inputting said datum $A_j$ and said input indicating signal $T_j$ to data holding means $R_i$, the i-th among n stages of data holding means $R_1, R_2, \ldots, R_n$, when the value indicated by said selecting signal $S_j$ is i. The data holding circuit then outputs, via $n-i$ stages of data holding means $R_{i+1}, R_{i+2}, \ldots, R_n$, the datum $A_j$, $n-i+1$ timing cycles later than the inputting of the datum $A_j$ when said input indicating signal $T_j$ indicates validity, and invalidates said datum $A_j$ when said input indicating signal $T_j$ indicates invalidity; where said m data $A_1, A_2, \ldots, A_j, \ldots, A_m$ and said m input indicating signals $T_1, T_2, \ldots, T_j, \ldots, T_m$ respectively corresponding to said data, are entered and valid data among the m data are successively outputted at $n \times k + 1$ (k is an integer, n is an integer and is equal to the number of stages of data holding means or the number of periodic value, e.g., if n=4 then $n \times k + 1 = \ldots, 13, 9, 5$ or 1) timing cycles.

The selection signal generating circuit for generating selection signals to determine the durations of data holding by the data holding circuit are controlled with input indicating signals $T_1, T_2, \ldots, T_j, \ldots, T_m$ indicating the validity or invalidity of the input data $A_1, A_2, \ldots$ ..., $A_j$, ..., $A_m$. If the input indicating signals $T_1$, $T_2$, ..., $T_j$, ..., $T_m$ consecutively indicate validity, the selection signal will retain its value for the first input datum. However, if an input indicating signal $T_j$ indicating invalidity is inputted midway, the selection signal will change to its next value. Even if the input timings of different data are irregular or some of the input data are invalid, the data holding circuit sends out at proper timings only effective data for ensuing processings. This is done by controlling the data holding durations and the validity or invalidity of the input data $A_j$ in accordance with the selection signals generated by said selection signal generating circuit and said input indicating signals.

In order to achieve the above object, a third pipeline circuit according to the present invention comprises:

a selection signal generating circuit for outputting a selection signal $S_j$ indicating the value next to the preceding selection signal $S_{j-1}$ out of n periodic values 1, 2, ..., n, 1, 2, ... when an input indicating signal $T_j$ entered corresponding to one datum $A_j$ out of a series of m input data $A_1$, $A_2$, ..., $A_m$ indicates invalidity, and, a selection signal $S_j$ indicating the same value as that indicated by the selection signal $S_{j-1}$, when the input indicating signal $T_j$ indicates validity, and an indicating signal holding circuit for outputting an output indicating signal $V_j = T_j$, when the value indicated by the selection signal $S_j$ corresponding to the input of said input indicating signal $T_j$ and said selection signal $S_j$ is n or, when the value indicated by the selection signal $S_j$ is i (i<n), inputting said input indicating signal $T_j$ to indicating signal holding means $F_i$, the i-th among the n−1 stages of indicating signal holding means $F_1$, $F_2$, ..., $F_{n-1}$, and outputting it via n−i−1 stages of indicating signal holding means $F_{i+1}$, $F_{i+2}$, ..., $F_{n-1}$ as the output indicating signal $V_j$ n−i timing cycles later than the inputting of the input indicating signal $T_j$, a data holding circuit for inputting the datum $A_j$ to data holding means $R_i$, the i-th among n stages of data holding means $R_1$, $R_2$, ..., $R_n$, when the value indicated by said selecting signal $S_j$, corresponding to said datum $A_j$ and said output indicating signal $V_j$, is i (i<n). The datum $A_j$ is then conveyed as a datum P via n−i−1 stages of data holding means $R_{i+1}$, $R_{i+2}$, ..., $R_n$ n−i timing cycles later than the inputting of the datum $A_j$. However, when the value indicated by said selection signal $S_j$ is n, conveying the datum $A_j$ as the datum P to said n-th data holding means $R_n$ and, either said output indicating signal $V_j$ indicates invalidity, invalidating the input to said n-th data holding means $R_n$ or, when said output indicating signal $V_j$ indicates validity, conveying said datum P to said n-th data holding means $R_n$ and outputting said datum P 1 timing cycle later; where said m data $A_1$, $A_2$, ..., $A_j$, ..., $A_m$ and said m input indicating signals $T_1$, $T_2$, ..., $T_j$, ..., $T_m$ respectively corresponding to said data are entered and effective data among the m data are successively outputted at n×k+1 (k is an integer) timing cycles.

The selection signal generating circuit for generating selection signals to determine the durations of data holding by the data holding circuit are controlled with input indicating signals $T_1$, $T_2$, ..., $T_j$, ..., $T_m$ indicating the validity or invalidity of the input data $A_1$, $A_2$, ..., $A_j$, ..., $A_m$. If the input indicating signals $T_1$, $T_2$, ..., $T_j$, ..., $T_m$ consecutively indicate validity, the selection signal will retain its value for the first input datum, but if an input indicating signal $T_j$ indicating invalidity is inputted midway, the selection signal will change to its next value. Further, the output indicating signal $V_j$ indicating whether the input to the n-th data holding means Rn of the data holding circuit is to be validated or invalidated is generated by the indicating signal holding circuit on the basis of the input indicating signal $T_j$ and the selection signal $S_j$. The data holding circuit, even if the input timings of different data are irregular or the input include both valid and invalid data, sends out at the proper timings, only effective data for ensuing processings by controlling the data holding durations and the validity or invalidity of the input data $A_j$. This is in accordance with the selection signals generated by the selection signal generating circuit and the output indicating signals generated by the indicating signal holding circuit.

Features and advantages of the present invention will become more apparent from the following detailed description when taken in conjunction with the accompanying drawings.

BRIEF DESCRIPTION OF THE DRAWINGS

FIG. 6 is a timing chart illustrating an example of the operation of an input crossbar using an output from the pipeline circuit which is the second embodiment of the invention.

In the figures, the same reference numerals denote respectively the same constituent elements.

DETAILED DESCRIPTION OF THE INVENTION

Figure 8:
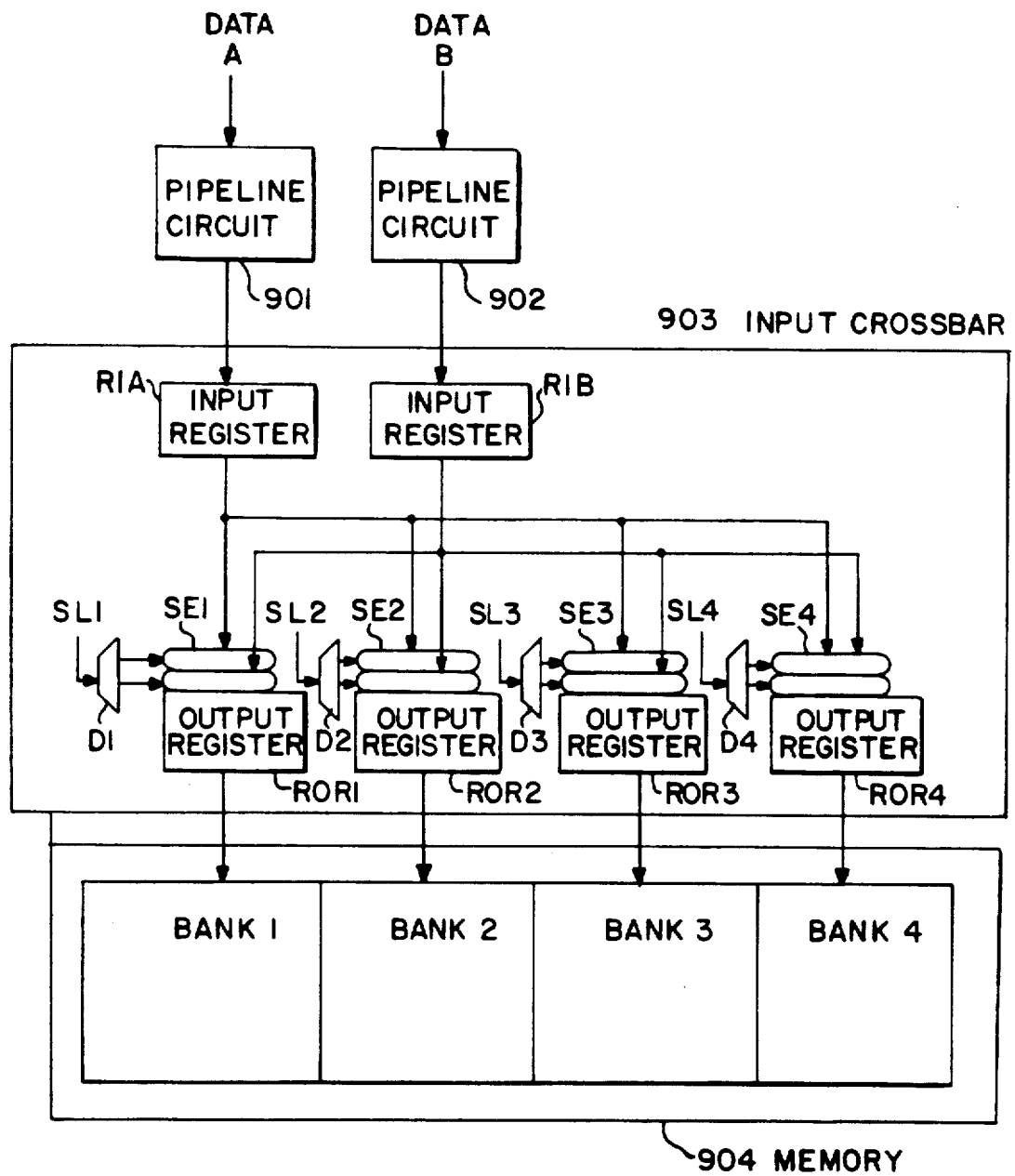
FIG. 8 is a block diagram of an example of the configuration of a data processing apparatus having a memory comprising four banks.
Figure 9:
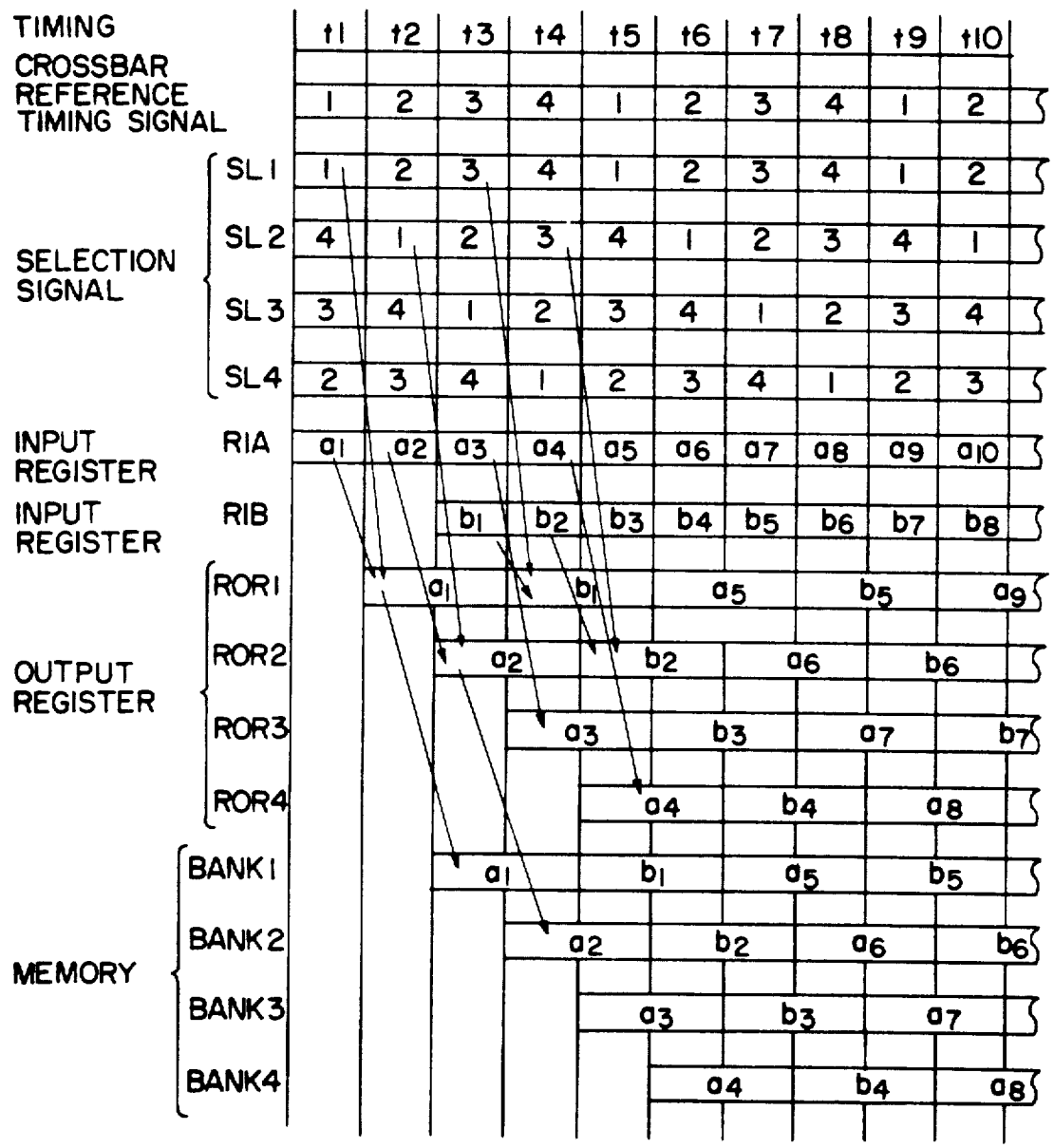
FIG. 9 is a time chart illustrating an example of the operation of the input crossbar 903 of FIG. 8.

FIG. 8 is a typical block diagram of memory-peripheral circuits of a data processing apparatus capable of writing serial data $A = (a_1, a_2, \ldots, a_m)$ and serial data $B = (b_1, b_2, \ldots, b_m)$ into a memory 904 comprising four banks, BANK1, BANK2, BANK3 and BANK4. FIG. 9 is a time chart illustrating the operation of an input crossbar 903 in FIG. 8.

Referring to FIGS. 8 and 9, each of the banks BANK1 to BANK4 of the memory 904 requires two timing cycles of time in order that data be written into them. An input register RIA, whose input is the serial data $A = (a_1, a_2, \ldots, a_m)$, is assigned reference timing cycle 1 of crossbar control and another input register RIB, whose input is the serial data $B = (b_1, b_2, \ldots, b_m)$, is assigned reference timing 3 of crossbar control.

An output register ROR1 has a decoder D1 for decoding a selection signal SL1 and a selecting circuit SE1 for selecting and outputting an input corresponding to the output of the decoder D1. The selecting circuit SE1 selects and stores the output data from the input register RIA when the reference timing cycle is 1, selects and stores the output data from the input register RIB when the reference timing cycle is 3, and holds the previous data when the reference timing cycle is 2 or 4.

Output registers ROR2, ROR3 and ROR4 respectively have decoders D2, D3 and D4 for decoding selection signals SL2, SL3 and SL4 and selecting circuits SE2, SE3 and SE4 for selecting and outputting their inputs corresponding to the outputs of the decoders D2, D3 and D4. Output registers ROR2, ROR3 and ROR4, operate in the same manner as the output register ROR1 in response to the selection signals SL2, SL3 and SL4, respectively.

Referring now to FIG. 9, the output register ROR1 selects the output datum a1 from the input register RIA at timing t1 in response to the value "1" of the selection signal SL1, then stores it at timing t2 and holds it until timing t3. It selects the output datum $b_1$ from the input register RIB in response to the value "3" of the selection signal SL1, and the datum $b_1$ is stored at timing t4 and is held until timing t5. In this manner, the $4 \times k + 1$-th (k is a natural number) data $a_1, b_1, a_5, b_5, a_9, b_9, \ldots$ of the two serial data A and B are successively stored into the output register ROR1, and become input data for the bank BANK1 of the memory 904.

Similarly, the $4 \times k + 2$-th data $a_2, b_2, a_6, b_6, a_{10}, b_{10}, \ldots$ of the two serial data A and B are successively stored into the bank BANK2 through the output register ROR2; the $4 \times k + 3$-th data $a_3, b_3, a_7, b_7, a_{11}, b_{11}, \ldots$ of the two serial data A and B are successively stored into the bank BANK3, and the $4 \times k + 4$-th data $a_4, b_4, a_8, b_8, a_{12}, b_{12}, \ldots$ of the two serial data A and B are successively stored into the bank BANK4.

The operations described with reference to FIG. 9 presupposes that $4 \times k + 1$-th data $a_1, a_5, a_9, \ldots$ of the serial data A is entered into the input register RIA and the $4 \times k + 3$-th data $b_7, b_7, b_{11}, \ldots$ of the serial data B are entered into the input register RIB when the reference timing cycle of the input crossbar 903 is "1"; the $4 \times k + 2$-th data $a_2, a_6, a_{10}, \ldots$ of the serial data A and the $4 \times k + 4$-th data $b_4, b_8, b_{12}, \ldots$ of the serial data B are entered into the input registers RIA and RIB, respectively, when said reference timing cycle is "2"; the $4 \times k + 3$-th data $a_3, a_7, a_{11}, \ldots$ of the serial data A and the $4 \times k + 1$-th data $b_1, b_5, b_9, \ldots$ of the serial data B are entered into the input registers RIA and RIB, respectively, when said reference timing cycle is "3"; and the $4 \times k + 4$-th data $a_4, a_8, a_{12}, \ldots$ of the serial data A and the $4 \times k + 2$-th data $b_2, b_6, b_{10}, \ldots$ of the serial data B are entered into the input registers RIA and RIB, respectively, when said reference timing cycle is "4".

Now a form of data to which the present invention applies is described below.

One of the types of data to which the invention applies is a series X of data $x_1, x_2, \ldots, x_m$, wherein the intervals between the elemental data $x_1, x_2, \ldots$ are irregular.

An example of this type is output data from a processing unit whose processing time differs with the value of each datum or the like. Consider data $R = (r_1, r_2, \ldots r_m)$ outputted from an arithmetic unit or a processor in which arithmetic operations, differing with a datum-corresponding control signal $V = (v_1, v_2, \ldots, v_m)$, take place between a series Y of operand data $y_1, y_2, \ldots, y_m$ and another series W of operand data $w_1, w_2, \ldots, w_m$. In addition, the processing time differs with the type of operation and the value of datum. This is an example of irregular intervals between elemental data as mentioned above. If data are successively outputted at irregular intervals, for instance the second datum $r_2$ comes out five timing cycles after the first datum $r_1$ and the third $r_3$ does three timing cycles after that, and if the arithmetic unit is a type which holds a datum until the next datum is outputted, a description of equal intervals on the time axis (i.e. at every timing cycle) will be $D = (r_1, r_1, r_1, r_1, r_1, r_1, r_2, r_2, r_2, r_3, \ldots, r_m)$. A case in which invalid data come out between valid data will be represented in such a way as $E = (r, -, -, -, -, r_2, -, -, r_3, \ldots, r_m)$. Outputs of such an arithmetic unit require signals indicating the timings of valid data for ensuring data correspondence. If validity is represented by "1" and invalidity, by "0", then a signal F indicating a valid datum and the above data D or E is $F = (1, 0, 0, 0, 0, 1, 0, 0, 1, \ldots, 1)$, which corresponds to data $G = (g_1, g_2, \ldots, g_t)$ representing D and E. In the foregoing examples, $g_1 = r_1, g_6 = r_2, g_9 = r_3 \ldots, g_t = r_m$, and all other elemental data $g_2, g_3, g_4, g_5, g_7, g_8, \ldots$ are invalid data whose values are irrelevant here.

Another example of irregular intervals between elemental data of a data series is found in data read out of a memory, whose access time varies with the address. Further, if data from a processing system, whose data transfer rate varies with the mode of use or the state of hardware, (for instance, a system of three processing units two of which continue processing in the event of one running into trouble), are to be placed under the same control irrespective of the mode of use or the state of hardware, there will be required, as described above, the combination of a data series including both valid and invalid data and a corresponding signal indicating the validity or invalidity of each elemental datum. The data and the indicating signal can be represented like the aforementioned data G and indicating signal F, respectively.

Another type of data to which the present invention applies is when the validity or invalidity of individual data is indicated by another set of data. In a vector data processing apparatus, for instance, the concept of a mask bit is used to distinguish between valid and invalid elemental data among vector data. A mask bit indicates valid data among operand vector data, so that valid data alone can be put to arithmetic operation or the operation is executed for all data and the validity or invalidity of the data resulting from the operation is indicated with a mask bit. These manners of operation are known as masked operations. Like the data of the first type described above, the vector data can be represented by $H = (h_1, h_2, \ldots, h_t)$ and the mask data, by $J = (j_1, j_2, \ldots, j_t)$.

Now, in the following description, said first and second types will be represented by an input data series $A = (a_1, a_2, \ldots, a_m)$ and indicating signals $T = (1, 0, \ldots, 1)$ indicating the validity or invalidity of the data. This means that, where elemental data $a_1, a_2, \ldots, a_m$ are consecutively inputted in every timing cycle, $a_1$ is a valid datum, $a_2$, an invalid datum . . . .

Figure 1:
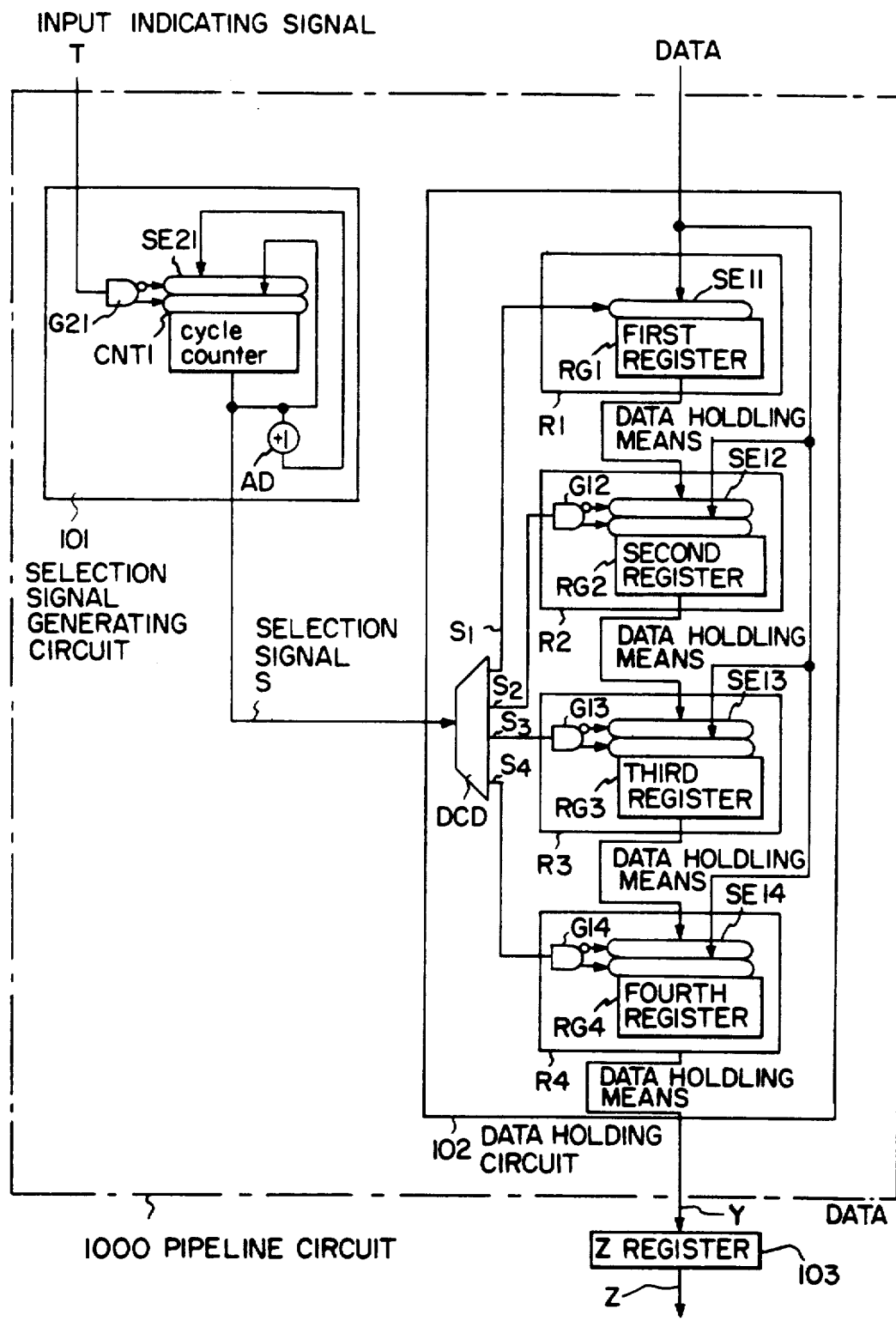
FIG. 1 is a block diagram of a first preferred embodiment of the invention.

Referring now to FIG. 1, a pipeline circuit 1000 in the first preferred embodiment of the present invention has as inputs an indicating signal T and a data series $A = (a_1, a_2, \ldots, a_m)$, and has as outputs a data series $Y = (y_1, y_2, \ldots, y_m)$.

A selection signal S from a selection signal generating circuit 101 is inputted to a data holding circuit 102, and is decoded by a decoder DCD to generate selection signals $S_1$, $S_2$, $S_3$ and $S_4$ for four stages of data holding means $R_1$, $R_2$, $R_3$ and $R_4$, respectively, into one of which stores the input data A. If the selection signal $S_3$ out of the selection signals $S_1$, $S_2$, $S_3$ and $S_4$ is valid (logical "1"), the data A will be stored into the data holding means R3. The data A stored in the data holding means R3 are stored into the data holding means R4 one timing cycle later. The data A become the output data of the data holding circuit 102, i.e. the output data Y of the pipeline circuit 1000.

The data holding means $R_2$ can be realized, for instance as illustrated, with a register RG2 having a two-input one-output selecting circuit SE12. The first and second stage inputs of SE12 are respectively supplied by the output of the first data holding means $R_1$ and the input data A. Also, a gate G12 provides the inverted signal of the selection signal $S_2$ to the first stage of the selecting circuit SE12 and at the same time provides the uninverted selection signal $S_2$ to the second stage of the selecting circuit SE12. This data holding means $R_2$ selects and stores the data A when the selection signal $S_2$ is valid or selects and stores the output data of the data holding means $R_1$ when the selection signal $S_2$ is invalid (logical "0").

The data holding means R3 and R4, like the data holding means R2, can be respectively realized with registers RG3 and RG4 having two-input one-output selecting circuits SE13 and SE14 to whose first and second stage inputs are supplied the outputs of the preceding-stage data holding means R2 and R3 and the input data A, respectively. Again gates G13 and G14 provide the inverted signals of the selection signals $S_3$ and $S_4$ to the first stages of the selecting circuits SE13 and SE14. At the same time, G13 and G14 provide the uninverted selection signals $S_3$ and $S_4$ to the second stages of the selecting circuits SE13 and SE14. The data holding means R1 can be realized with a register RG1 having a selecting circuit SE11 which outputs the data A when the selection signal $S_1$ is valid and stores the data A through this selecting circuit SE11.

If the input indicating signal T, corresponding to the data A, indicates invalidity (logical "0"), the selection signal generating circuit 101 generates and outputs a selection signal S indicating the value next to that indicated by the preceding selection signal S out of four periodic values 1, 2, 3, 4, 1, 2, . . . . For instance, if an input indicating signal $T = 0$ is inputted when the selection signal S indicates "1", the selection signal S will indicate "3" at the next timing. Similarly, if an input indicating signal $T = 0$ is inputted when the selection signal S indicates "2", the selection signal S will indicate "3" at the next timing. If an input indicating signal $T = 0$ is inputted while the selection signal S indicates "2", the selection signal S will indicate "4" at the next timing, and if an input indicating signal $T = 0$ is inputted when the selection signal S indicates "4", the selection signal S will indicate "1" at the next timing.

Conversely, if the input indicating signal T indicates validity (logical "1"), the selection signal generating circuit 101 will hold the value indicated by the preceding selection signal S. If, for instance, an input indicating signal $T = 1$ is inputted when the selection signal S indicates "1", then the selection signal S will indicate "1" at the next timing, too.

The selection signal generating circuit 101 referred to above can be realized, as illustrated, with a cycle counter CNT having a two-input one-output selecting circuit SE21. The first and second stage inputs of SE21 are supplied the output of a +1 circuit AD and the current value of the selection signal S, respectively. In addition, a gate G21 provides the inverted signal of the input indicating signal T to the first stage of the selecting circuit SE21 and at the same time the uninverted selection signal T to the second stage of said selecting circuit. This cycle counter CNT varies the value of the selection signal in synchronism with the timing cycle by either selecting the value "S+1", which is the output of the +1 circuit AD, when the input indicating signal T is "0", or the value "S" when T is "1". This selection signal S can indicate one of four values, 1, 2, 3 and 4.

The operation of the pipeline circuit 1000 will be described below with reference to the time chart of FIG. 2. Said registers RG1 to RG4 in the data holding means R1, R2, R3 and R4 are represented by first, second, third and fourth registers, respectively. A register, which receives the input and stores the output of data Y from the pipeline circuit 1000 and outputs them as data Z, is represented by a Z register 103.

Figure 2:
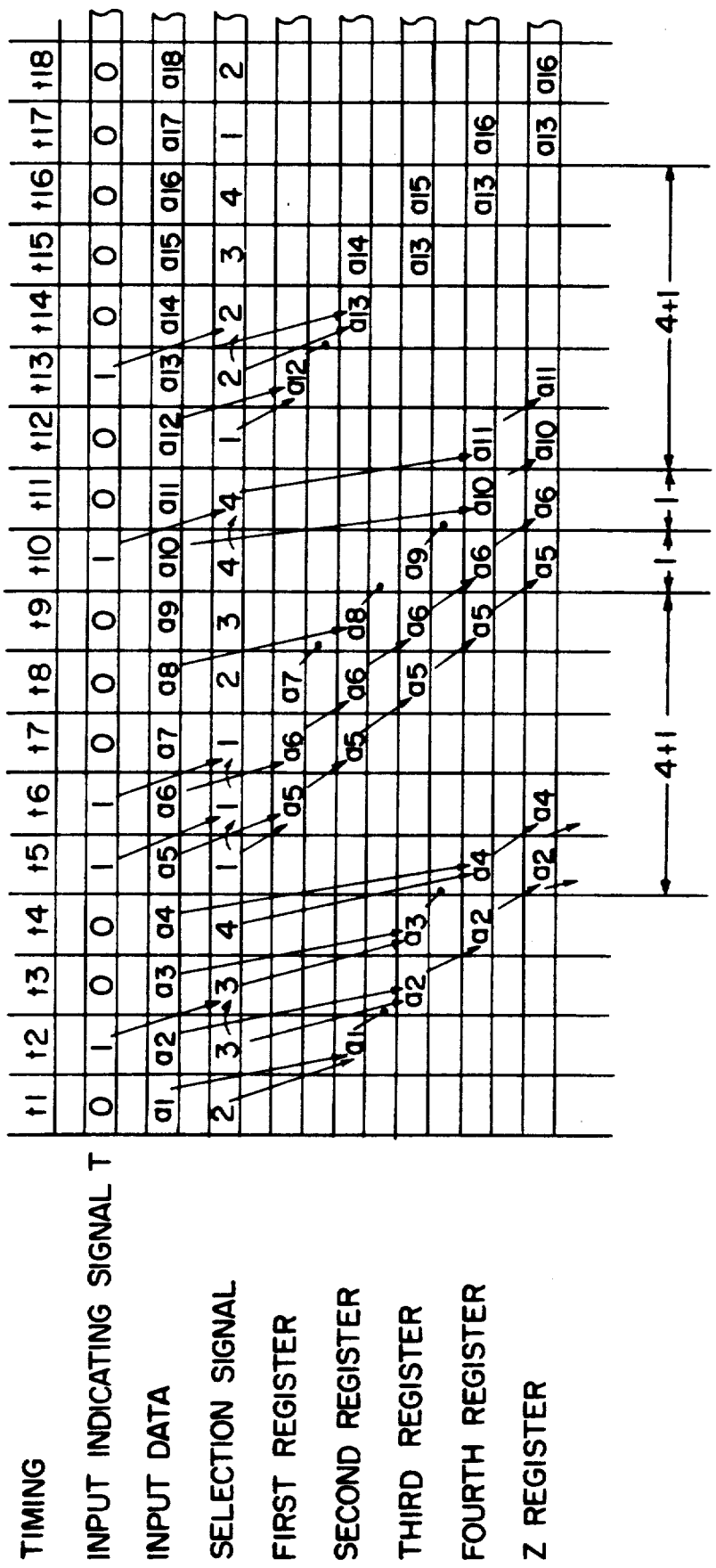
FIG. 2 is a time chart illustrating the operation within the pipeline circuit which is the first preferred embodiment of the invention.

In FIG. 2, input indicating signals T corresponding to the input data series $A = (a_1, a_2, a_3, \ldots)$ are supposed to be (0, 1, 0, 0, 1, 1, 0, 0, 0, 1, 0, 0, 1, 0, 0, 0, 0, . . . ). Thus $a_2$, $a_5$, $a_6$, $a_{10}$, and $a_{13}$, . . . are valid data. Conversely, $a_1$, $a_3$, $a_4$, $a_7$, $a_8$, $a_9$, $a_{11}$, $a_{12}$, $a_{14}$, $a_{15}$, $a_{16}$, $a_{17}$, and $a_{18}$, . . . are invalid data.

Further, the timing at which the first elemental datum $a_1$ of the input data series A is entered is t1, and the selection signal S at that time indicates "2". Before the datum $a_1$ is entered, i.e. before timing t1, the selection signal S periodically varies to indicate one or another of four recurring values, 1, 2, 3, 4, 1, 2, 3, 4, 1, ... until it indicates "2" at timing t1.

Referring to FIG. 2, the datum $a_1$ inputted at timing t1 is entered into the second register RG2 in response to the selection signal S ($=2$) at that time, and stored at the next timing t2. The selection signal S at timing t2 indicates "3", the value next to that of the selection signal S ($=2$) of timing t1 in response to the input indicating signal T ($=0$) at the preceding timing t1.

Then, the datum $a_2$ inputted at timing t2 is entered into the third register RG3 in response to the selection signal S ($=3$) at that time, and stored at the next timing t3. The datum $a_1$ stored into the second register RG2 is not stored into the third register RG3 at timing t3 and instead is invalidated. The selection signal S at timing t3, in response to the input indicating signal T ($=1$) at the preceding timing t2, is stored at timings t4, t5, t9, t10, t11, t12, t16 and t17, ... to become an element datum of the output data series Y of the pipeline circuit 1000, and stored into the Z register 103 at the respectively next timings t5, t6, t10, t11, t12, t13, t17 and t18, ....

The intervals of the output timings of the valid data $a_2$, $a_5$, $a_6$, $a_{10}$, $a_{13}$, ... among the elemental data of the input serial data $A = (a_1, a_2, a_3, ...)$ are $4 \times k + 1$ timing cycles (k is an integer), such as $5 (=4 \times 1 + 1)$ timing cycles between the data $a_2$ and $a_5$, $1 (=4 \times 0 + 1)$ timing cycle between the data $a_5$ and $a_6$, 1 timing cycle between the data $a_6$ and $a_{10}$, 5 timing cycles between the data $a_{10}$ and $a_{13}$, ....

If the pipeline circuit 1000 is used as pipeline circuits 901 and 902 in FIG. 8, said Z register 103 will correspond to the input registers RIA and RIB.

Now, with reference to the time chart of FIG. 3, an example of the operation of the pipeline circuit 902 will be described. Here, a reference timing cycle "1" of the input crossbar 903 is assigned to the input register RIA, another reference timing cycle "3" of the input crossbar 903, to the input register RIB, and timing t5 shown in FIG. 2 (the timing at which the data $a_2$ is stored into the Z register 103, i.e. the input register RIA) coincides with the crossbar reference timing "1" (namely the operation shown in FIG. 2 is that of the pipeline circuit 901).

It is not meant that each reference timing cycle shown here has hardware items, such as a cycle counter, rather it is a virtual timing cycle for designing or verifying a circuit for controlling data transfers. Hence, nothing more is required except to insure that the timings of different parts within the data processing apparatus be consistent with one another.

Figure 3:
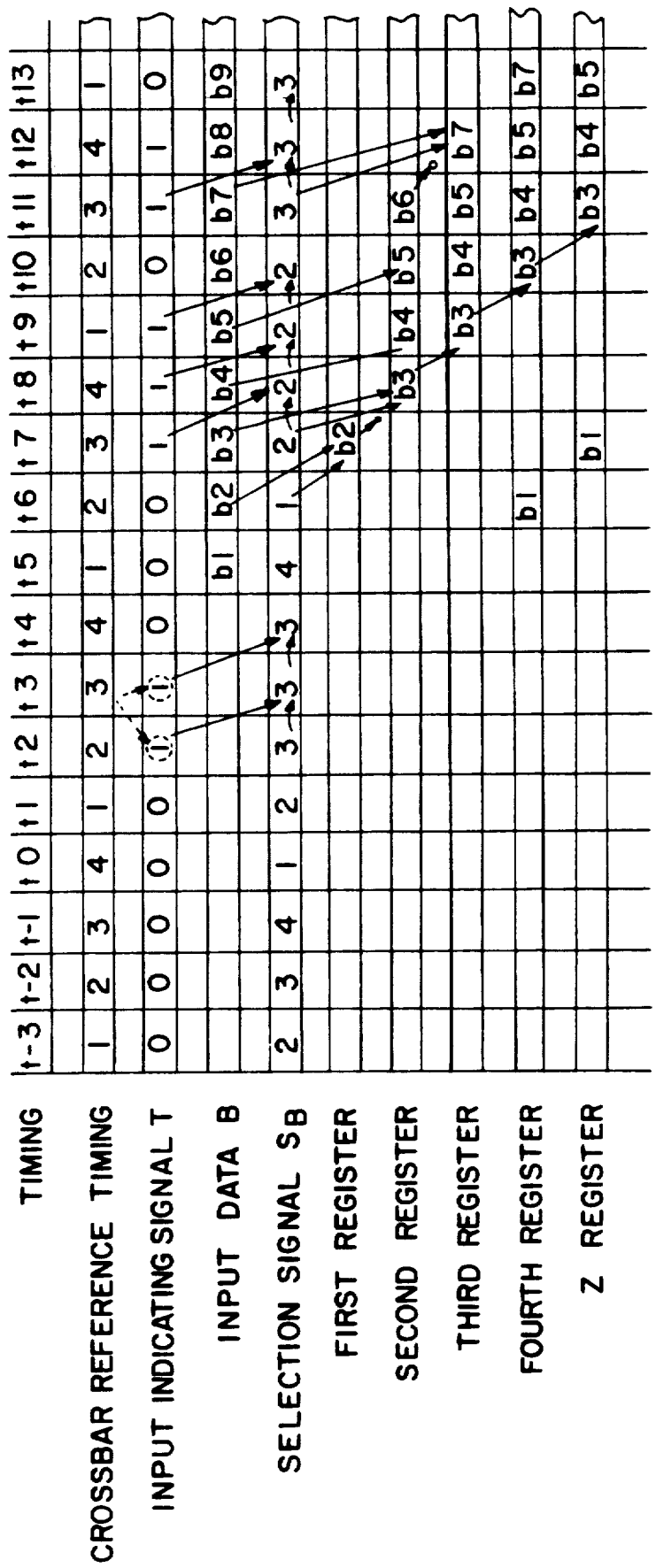
FIG. 3 is a time chart illustrating one example of method to stagger the operating timings of the pipeline circuit illustrated in FIG. 1.

Referring now to FIG. 3, at timings before timing t0, a selection signal $S_B$ varies one timing cycle ahead of the crossbar reference timing. Thus, if the first valid datum is inputted (accompanied by the input indicating signal T ($=1$)) in this state, the valid datum will be stored into the Z register 103 (i.e. the input register RIB) when the crossbar reference timing is "1". Since the crossbar reference timing of "3" is assigned to the input register RIB whose inputs are the data series B as stated above, the operating timing has to be shifted.

If, for instance, a dummy input indicating signal T$=1$ is inputted twice at timings preceding the inputting of the first valid datum, the pipeline circuit 902 can store the first effective datum into the input register RIB when the crossbar reference timing is "3". Thus, referring to FIG. 3, by inputting the dummy input indicating signal T$=1$ at timings t2 and t3, the pipeline circuit 902 will be standing by at timing t4 in a state one timing cycle behind the crossbar reference timing.

If, in that state, the input data series B ($=b_1, b_2, b_3, ...$) and the input indicating signals T ($=0, 0, 1, 1, 1, 0, 1, 1, 0, 0, 0, 1, ...$) corresponding to the data, are entered from timing t5 on, the pipeline circuit 902 will operate in the same manner as the pipeline circuit described with reference to FIG. 2. The data $b_1, b_3, b_4, b_5, b_7, ...$ will be stored into the fourth register, which is also an output register of the pipeline circuit 902, at timings t6, t10, t11, t12, t13, ..., respectively, and will be stored into the Z register, i.e. the input register RIB, at the timings t7, t11, t12, t13, t14, ..., respectively.

Figure 4:
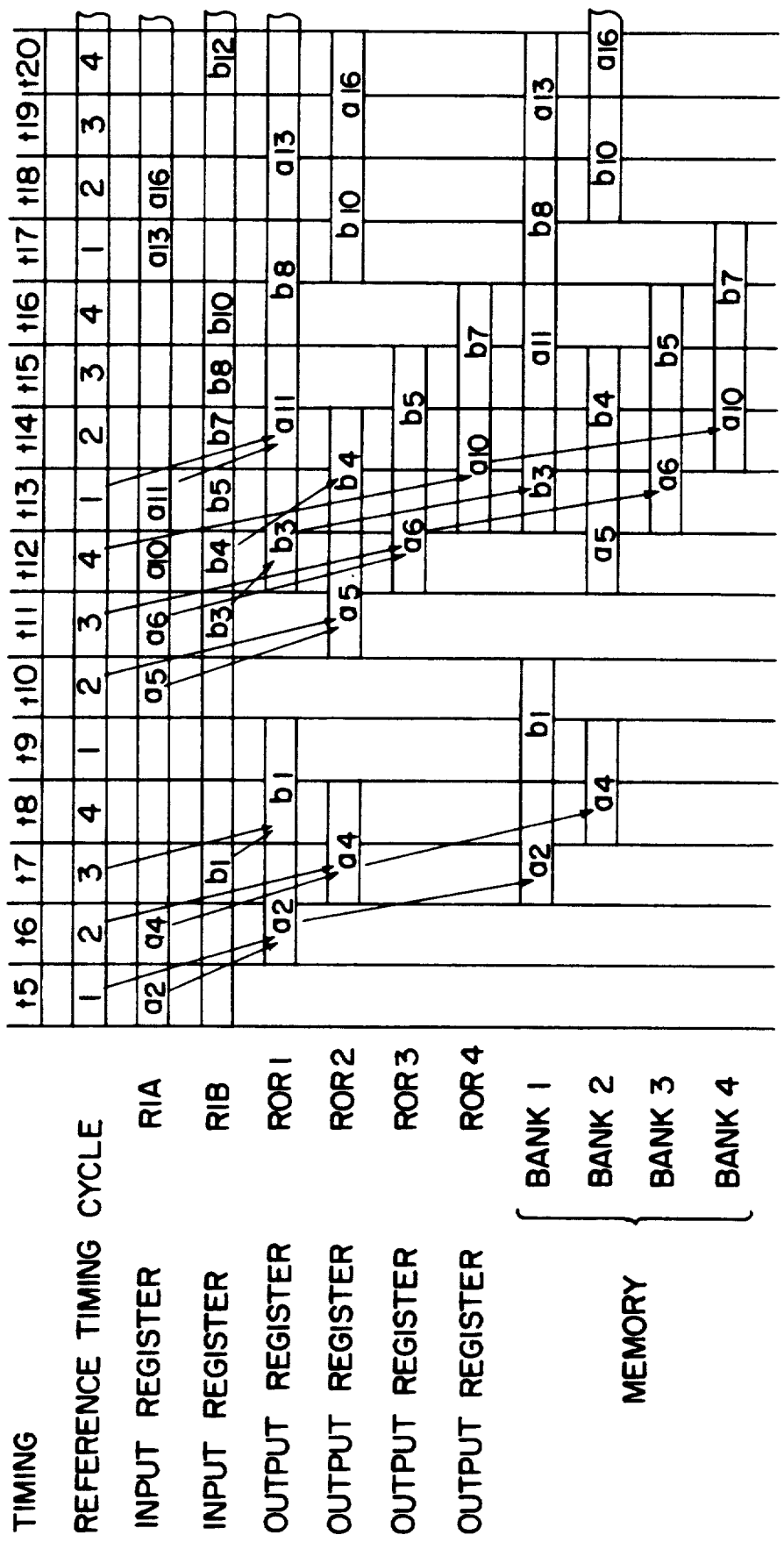
FIG. 4 is a timing chart illustrating an example of the operation of an input crossbar using an output from the pipeline circuit which is the first preferred embodiment of the invention.

The data entered into the input registers RIA and RIB by the operations illustrated in FIGS. 2 and 3 are further entered into the banks BANK1, BANK2, BANK3 and BANK4 of the memory 904 by the operation shown in the time chart of FIG. 4.

As stated above, a reference timing cycle of "1" is assigned to the input register RIA, and one of "3" to the input register RIB. The output register NOR1 selects and enters an output datum of the input register RIA when the reference timing cycle is "1"; stores it when the cycle is "2"; selects and enters an output datum of the input register RIB while holding the preceding datum when the cycle is "3"; stores it when the cycle is "4"; selects and enters another output datum of the input register RIA while holding the preceding datum when the cycle is again "1"; stores it when the cycle is again "2", ..., and repeats these same operations in the four timing cycles. Also, as described above, the output register ROR2 operates in the same manner as the output register ROR1 except that the former is one timing cycle behind the latter. Thus, it repeats in four timing cycles the operations of selecting and entering an output datum of the input register RIA, storing it at the next timing when the reference timing cycle is "2", selecting and entering an output datum of the input register RIB, and storing it at the next timing when the reference timing cycle is "4". The output register ROR3 operates in the same manner as the output register ROR2 except that the former is another timing cycle behind the latter, and this correspondingly applies to the output register ROR4.

As a result of these operations, as shown in FIG. 4, when the reference timing cycle is "1", the datum $a_2$ stored into the input register RIA at timing t5 is stored into the output register ROR1 at timing t6, and the datum $a_4$ stored into the input register RIA at timing t6 is stored into the output register ROR2 at timing t7; and when the reference timing cycle is "3", the datum $b_1$, stored into the input register RIB at timing t7, is stored into the output register ROR1 at timing t8. Similar operations are repeated thereafter, and the data $a_2$, $b_1$, $b_3$, $a_{11}$, $b_8$, $a_{13}$, ... are entered into the bank BANK1 of the memory via the output register ROR1, the data $a_4$, $a_5$, $b_4$, $b_{10}$, $a_{16}$, ... are entered into the bank BANK2 of the memory via the output register ROR2, the data $a_6$, $b_5$, ... are entered into the bank BANK3 of the memory via the output register ROR3, and the data $a_{10}$, $b_7$, ... are entered into the bank BANK4 of the memory via the output register ROR4.

Considering a serial data D ($=d_1d_2, d_3, d_4, d_5, ... = a_2, a_5, a_6, a_{10}, a_{13}, ...$) comprising only valid data from the serial data A ($=a_1, a_2, a_3, ...$) and a serial data F ($=f_1, f_2, f_3, f_4, f_5, ... = b_3, b_4, b_5, b_7, b_8, ...$) comprising only valid data from the serial data B ($=b_1, b_2, b_3, ...$), it is seen that the $4 \times k + 1$-th (k is an integer) data $d_1 (=a_2)$, $f_1 (=b_3)$, $d_5 (=a_{13})$, $f_5 (=b_8)$, ... of the serial data D and F are entered into the bank BANK1 of the memory; the $4 \times k + 2$-th (k is an integer) data $d_2 (=a_5)$, $f_2 (=b_4)$, ... of the data series D and F, are entered into the bank BANK2 of the memory; the $4 \times k + 3$-th data $d_3 (=a_6)$, $f_3 (=b_5)$, ... of the data series D and F, are entered into the bank BANK3 of the memory; and the $4 \times k + 4$-th data $d_4 (=a_{10})$, $f_4 (=b_7)$, ... of the data series D and F, are entered into the bank BANK4 of the memory.

Thus it is seen that the pipeline circuit according to the present invention is effective for adjusting the timing to supply data (even if the input data include invalid data), to an interleave type processing apparatus in a sequence for valid data only.

Figure 5:
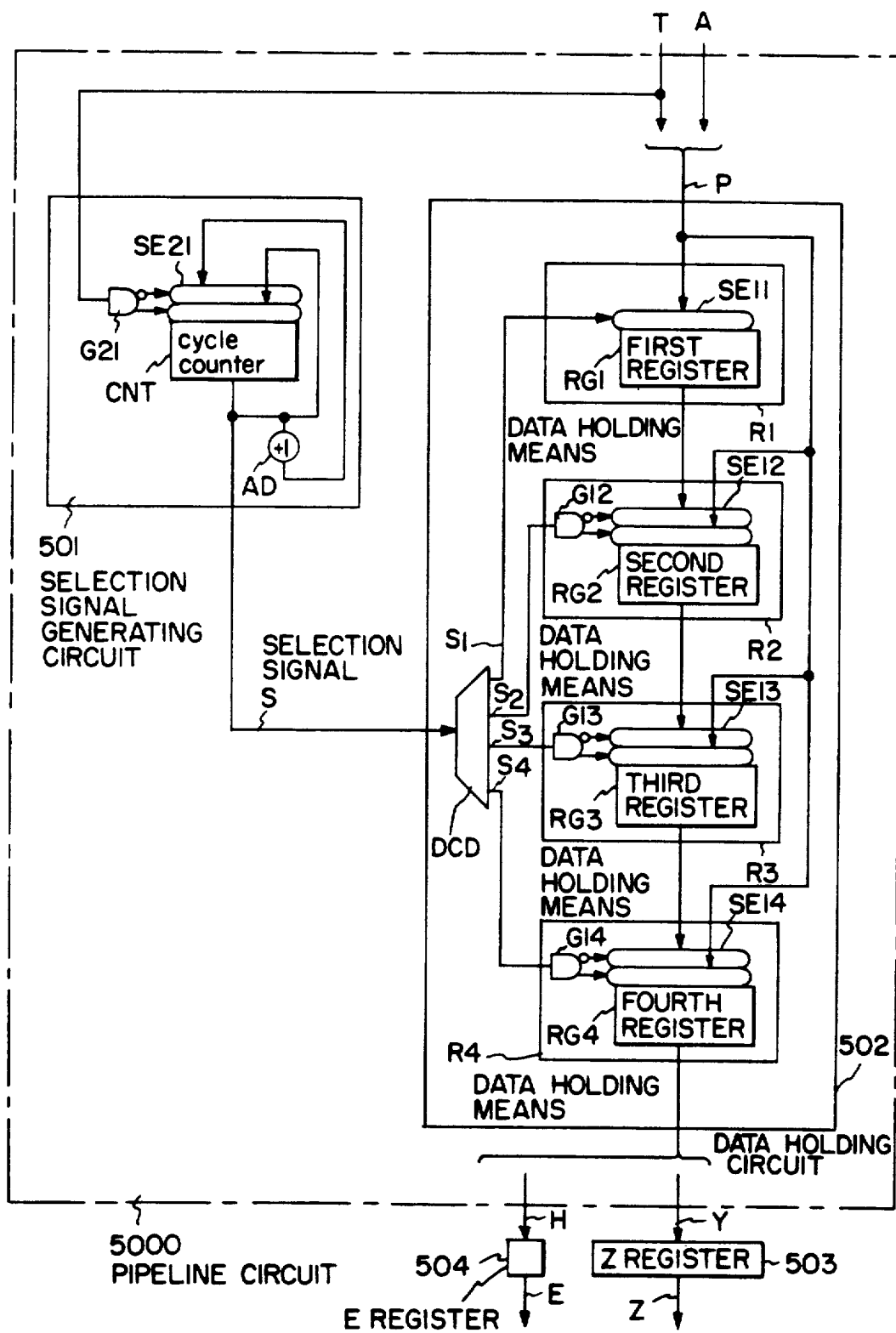
FIG. 5 is a block diagram of a second preferred embodiment of the invention.

FIG. 5 is a block diagram of a second preferred embodiment of the present invention, where the advantage of the pipeline circuit according to the invention is increased by having not only the input data series A but also the input indicating signals T, as referred to in the first embodiment shown in FIG. 1, inputted to a data holding circuit 502.

Referring to FIG. 5, a pipeline circuit 5000 has input indicating signals T and a data series A $(=a_1, a_2, \ldots, a_m)$, and supplies output indicating signals H and a data series Y.

The data holding circuit 502 receives a selection signal S from a selection signal generating circuit 501, decodes it with a decoder DCD into selection signals $S_1, S_2, S_3$ and $S_4$ for four stages of data holding means R1, R2, R3 and R4, respectively, and stores data P, each of which consists of a pair of one of the data A and an input indicating signal T corresponding to that datum, into one of the four-stage data holding means R1, R2, R3 and R4. If, for instance, the selection signal $S_3$ out of the selection signals $S_1, S_2, S_3$ and $S_4$ is valid, the data P will be stored into the data holding means R3. The data P stored in the data holding means R3 are stored into the data holding means R4 one timing cycle later in order to become the output data of the data holding circuit 502, i.e. of the pipeline circuit 5000. There is a Z register 503 and an E register 504 for respectively storing output data Y, corresponding to the input data A of the output data of the data holding circuit 502, and data H corresponding to the input indicating signals T of same, and outputting them as data Z and E.

Description of other parts of the pipeline circuit 5000 is dispensed with because they are equivalent to those of the pipeline circuit 1000 of FIG. 1.

Figure 6:
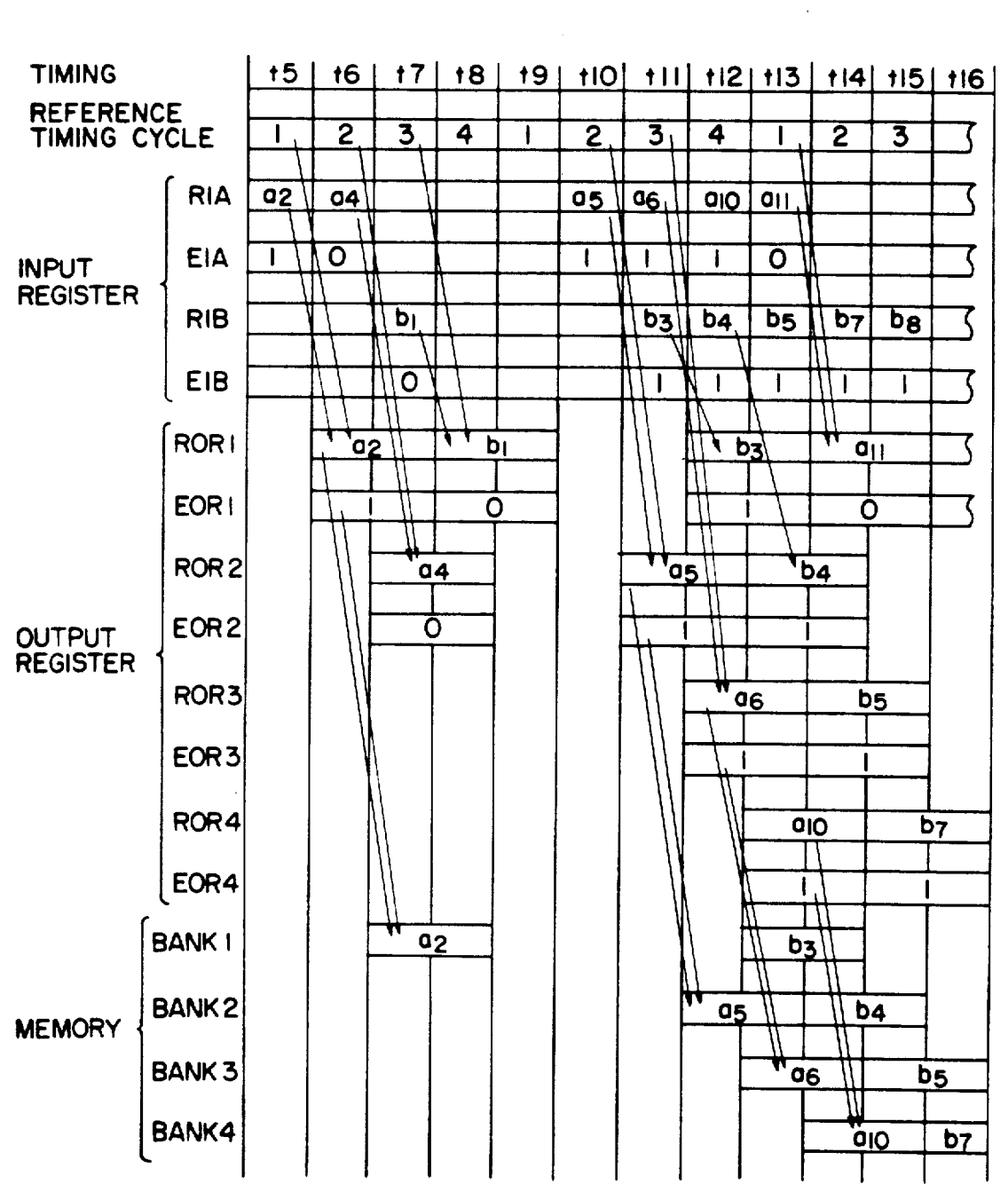
Figure 7:
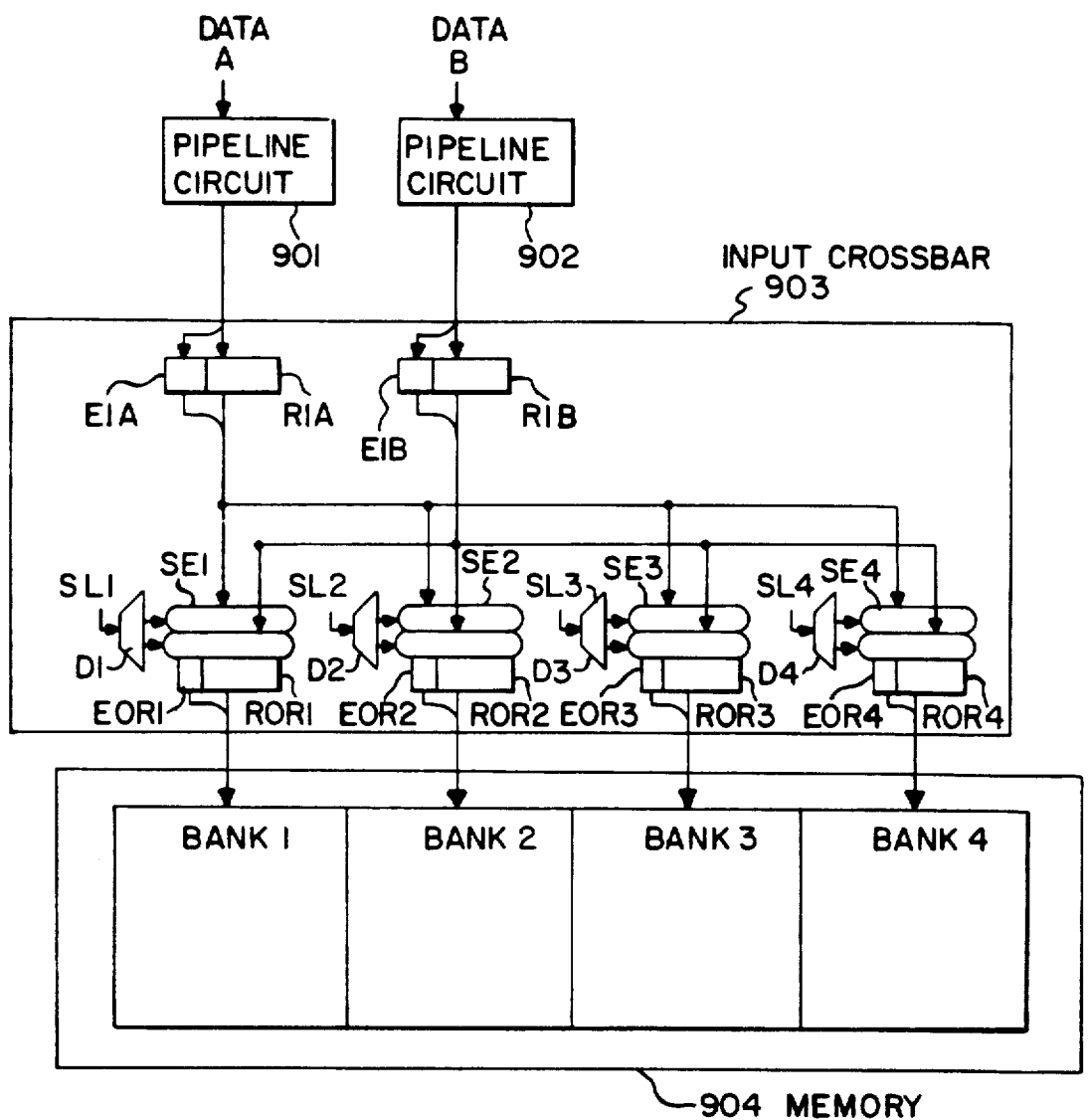
FIG. 7 is a block diagram of an example of the configuration memory-peripheral circuits to which the pipeline circuit, which is the second embodiment, is applied.

If the pipeline circuit 5000 is used as the pipeline circuits 901 and 902 in FIG. 8, a register combining said E register and Z register will correspond to the input registers RIA and RIB of the input crossbar 903, but, for the convenience of description, partial registers corresponding to the E register will be referred to as EIA and EIB and those corresponding to the Z register, as RIA and RIB as illustrated in FIG. 7. The registers RIA and EIA operate in the same manner, and so do the registers RIB and EIB. Similarly, partial registers EOR1 to EOR4, as shown in FIG. 7, are added as output registers, and it is assumed that the registers ROR1 and EOR1 operate in the same manner and as do the pair of registers ROR2 and EOR2, registers ROR3 and EOR3 and registers ROR4 and EOR4. An example of operation in the input crossbar 903 when the pipeline circuit 5000 is used as the pipeline circuits 901 and 902 in FIG. 7, with reference to the block diagram of FIG. 7 and the time chart of FIG. 6, will be discussed below.

Input indicating signals corresponding to the input serial data $A = (a_1, a_2, a_3, \ldots)$ to the pipeline circuit 901 being represented by $T_A (= 0, 1, 0, 0, 1, 1, 0, 0, 0, 1, 0, 0, 1, 0, 0, 0, 0, \ldots)$ and input indicating signals corresponding to the input serial data $B = (b_1, b_2, b_3, \ldots)$ to the pipeline circuit 902 being represented by $T_B (=0, 0, 1, 1, 1, 0, 1, 1, 0, 0, 0, 1, \ldots)$ are entered into the input registers RIA, EIA, RIB and EIB of the crossbar 903 as shown in FIG. 6 in the same manner as in the first embodiment described with reference to FIGS. 1 to 4.

Referring to FIG. 6, when the reference timing cycle is "1", the datum $a_2$ and the indicating signal "1" for the data $a_2$ stored at timing t5 into the input registers RIA and EIA respectively, are stored at timing t6 into the output registers ROR1 and EOR1 respectively; the datum $a_4$ and the indicating signal "0" for the data $a_4$ stored at timing t6 into the input registers RIA and EIA respectively, are stored at timing t7 into the output registers ROR2 and EOR2 respectively, and when the reference timing cycle is "3", the datum $b_1$ and the indicating signal "0" for the data b stored at timing t7 into the input registers RIA and EIB respectively, are stored at timing t8 into the output registers ROR1 and EOR1 respectively. Similar operations are repeated thereafter, so that the data $a_2, b_1, b_3, a_{11}, \ldots$ are stored into the output register ROR1; the indicating signals 1, 0, 1, 0, ... respectively corresponding thereto are stored into the output register EOR1; the data $a_4, a_5, b_4, \ldots$ are stored into the output register ROR2; the indicating signals 0, 1, 1, ... respectively corresponding thereto are stored into the output register EOR2; the data $a_6, b_5, \ldots$ are stored into the output register ROR3; the indicating signals 1, 1, ... respectively corresponding thereto are stored into the output register EOR3; and the data $a_{10}, b_7, \ldots$ are stored into the output register ROR4, the indicating signals 1, 1, ... respectively corresponding thereto are stored into the output register EOR4.

The datum $a_2$ and its corresponding indicating signal "1", stored into the output registers ROR1 and EOR1 respectively at timing t6, are entered into the bank BANK11 of the memory and, since the indicating signal is "1", the datum $a_2$ is stored into the bank BANK1 of the memory at timing t7.

The datum $a_4$ and its corresponding indicating signal "0" stored into the output registers ROR2 and EOR2 at timing t7 are entered into the bank BANK2 of the memory, but, since the indicating signal is "0", the datum $a_4$ is not stored therein.

Thereafter, by similar operations, the data $a_2, b_3, \ldots$ are stored into the bank BANK1, the data $a_5, b_4, \ldots$, into the bank BANK2, the data $a_6, b_5, \ldots$, into the bank BANK3, and the data $a_{10}, b_7, \ldots$, into the bank BANK4 of the memory.

By the operations described so far, the valid data $a_2, a_5, a_6, a_{10}, a_{13}, \ldots$ from the input serial data $A (=a_1, a_2, a_3, \ldots)$ and the valid data $b_3, b_4, b_5, b_7, b_8, \ldots$ from the input serial data $B (=b_1, b_2, b_3, \ldots)$ entered into the pipeline circuit, are stored in the memory in the sequence of valid data only.

Thus the pipeline circuit 5000 of FIG. 5 represents an addition to the functions of the pipeline circuit 1000 of FIG. 1, of another function, which conveys validity or invalidity of the output data to another circuit downstream.

Figure 10:
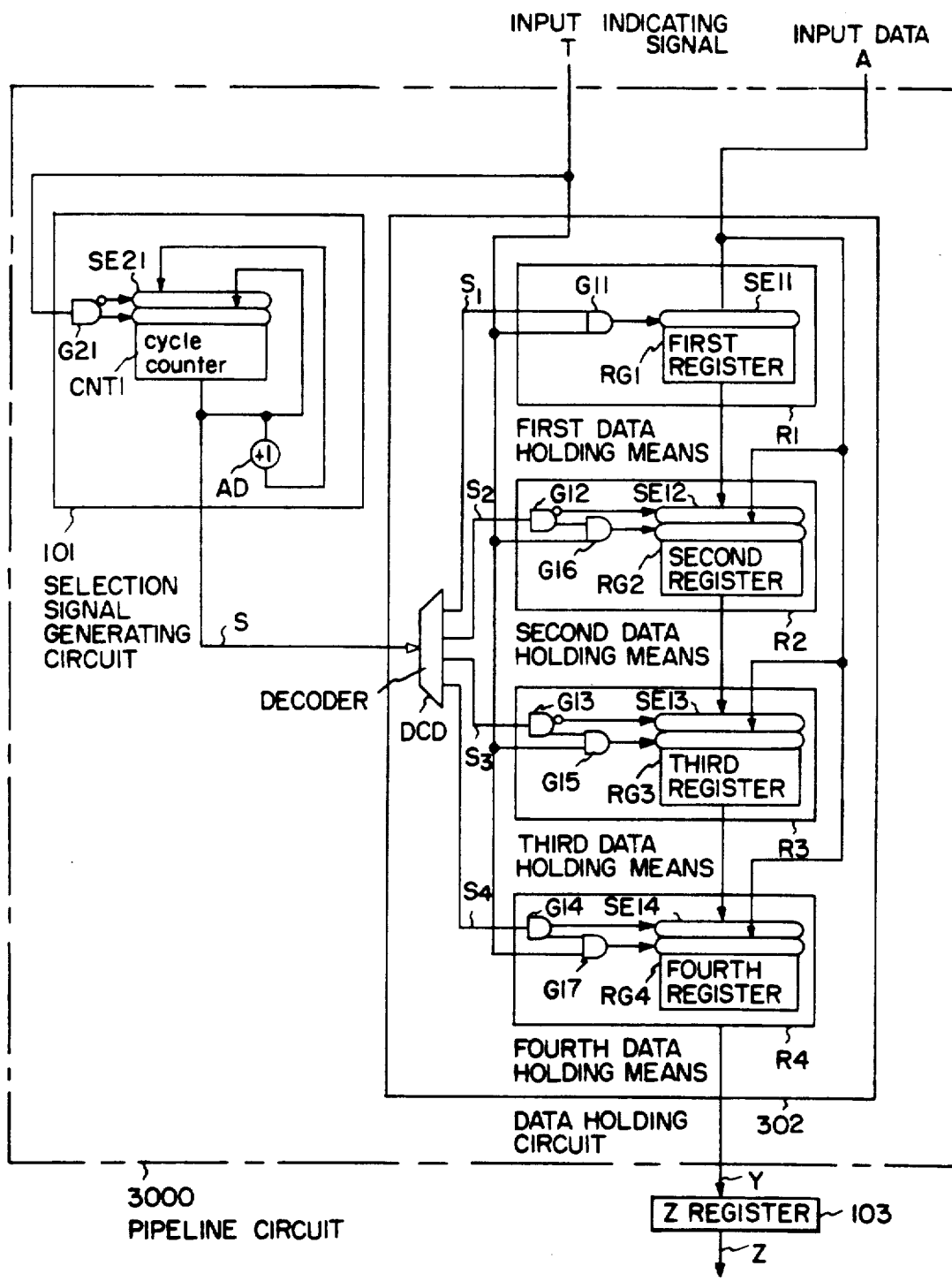
FIG. 10 is a block diagram of a third preferred embodiment of the invention.

Referring now to FIG. 10, a pipeline circuit 3000 in a third preferred embodiment of the present invention has input indication signals T and serial data $A (=a_1, a_2, \ldots$ ..., $a_m$) as its inputs and serial data Y ( $y_1, y_2, \ldots, y_l$) as its output.

A data holding circuit 302 receives the input of a selection signal S from a selection signal generating circuit 101, generates selection signals $S_1$, $S_2$, $S_3$ and $S_4$ for four stages of data holding means R1', R2', R3', and R4', respectively, by decoding the selection signal S, and stores the input data A into one of the four-stage data holding means R1', R2', R3' and R4'. If, for instance, the selection signal $S_3$ out of the selection signals $S_1$, $S_2$, $S_3$ and $S_4$ is valid (logical "1" for example), the data A will be stored into the data holding means R3'. If, however, the input indicating signal is invalid (logical "0" for example), the data A will be invalidated and not stored into the data holding means R3'. The data A, stored into the data holding means R3' when the input indicating signal T is valid, are stored into the data holding means R4' one timing cycle later, and supplied as the output data of the data holding circuit 302, i.e. as the output data Y of the pipeline circuit 3000.

The data holding means R2', for instance, can be realized as illustrated, with a register RG2 having a two-input one-output selecting circuit SE12 whose first and second-stage inputs are supplied with the output of the first data holding means R1' and the input data A, respectively, with a gate G12, which provides the inverted signal of the selection signal $S_2$ to the first stage of the selecting circuit SE12 and while simultaneously outputting the uninverted selection signal $S_2$, and with a gate G16, which supplies the logical product of the input indicating signal T and the selection signal $S_2$ to the second stage of the selecting circuit SE12. It selects and stores the data A if both the input indicating signal T and the selection signal $S_2$ are valid or the output data of the data holding means R1', if the selecting signal $S_2$ is invalid.

The data holding means R3' and R4', like the data holding means R2', can be respectively realized with registers RG3 and RG4 having two-input one-output selecting circuits SE13 and SE14, whose first and second stage inputs are supplied with the outputs of the preceding-stage data holding means R2' and R3' and the input data A, respectively, and with gates G15 and G17 which provide the inverted signals of the selection signals $S_3$ and $S_4$ to the first stages of the selecting circuits SE13 and SE14 and while simultaneously providing the uninverted selection signals $S_3$ and $S_4$ to the second stages of the selecting circuits SE13 and SE14. The data holding means R1' can be realized with a register RG1 having a selecting circuit SE11 which outputs the data A if the output of a gate G11 supplying the logical product of the selection signal $S_1$ and the input indicating signal T is valid, and stores the data A through this selecting circuit SE11.

The selection signal generating circuit 101, when the input indicating signal T entered corresponding to the data A indicates invalidity (logical "0"), generates and outputs a selection signal S indicating the value next to that indicated by the preceding selection signal S out of four periodic values 1, 2, 3, 4, 1, 2, .... For instance, if an input indicating signal T=0 is inputted when the selection signal S indicates "1", the selection signal S will indicate "2" at the next timing. Similarly, if an input indicating signal T=0 is inputted when the selection signal S indicates "2", the selection signal S will indicate "3" at the next timing; if an input indicating signal T=0 is inputted when the selection signal S indicates "3", the selection signal S will indicate "4" at the next timing, and if an input indicating signal T=0 is inputted when the selection signal S indicates "4", the selection signal S will indicate "1" at the next timing.

Conversely, if the input indicating signal T indicates validity (logical "1"), the selection signal generating circuit 101 will hold the value indicated by the preceding selection signal S. If, the input indicating signal T=0 is inputted when the selection signal S indicates "1", the selection signal S will indicate "1" at the next timing, too.

The selection signal generating circuit 101 referred to above can be realized, as illustrated, with a cycle counter CNT having a two-input one-output selecting circuit SE21, whose first and second stage inputs are supplied with the output of a +1 circuit AD and the current value of the selection signal S respectively, and a gate G21, which provides the inverted signal of the input indicating signal T to the first stage of the selecting circuit SE21 while simultaneously providing the uninverted selection signal T to the second stage of the selecting circuit SE21. This cycle counter CNT varies the value of the selection signal in synchronism with the timing cycle by selecting the value "S+1", which is the output of the +1 circuit AD, when the input indicating signal T is "0" or the value "S" when the input indicating signal T is "1". This selection signal S can indicate one of four values, 1, 2, 3 and 4.

The operation of the pipeline circuit 3000 will be described below with reference to the time chart of FIG. 11, in which said registers RG1 to RG4 in the data holding means R1', R2', R3' and R4' are represented by first, second, third and fourth registers, respectively, and a register which receives the input of the pipeline circuit 3000, stores the output data Y of the pipeline circuit 3000 and outputs them as data Z is represented by a Z register 103.

Figure 11:
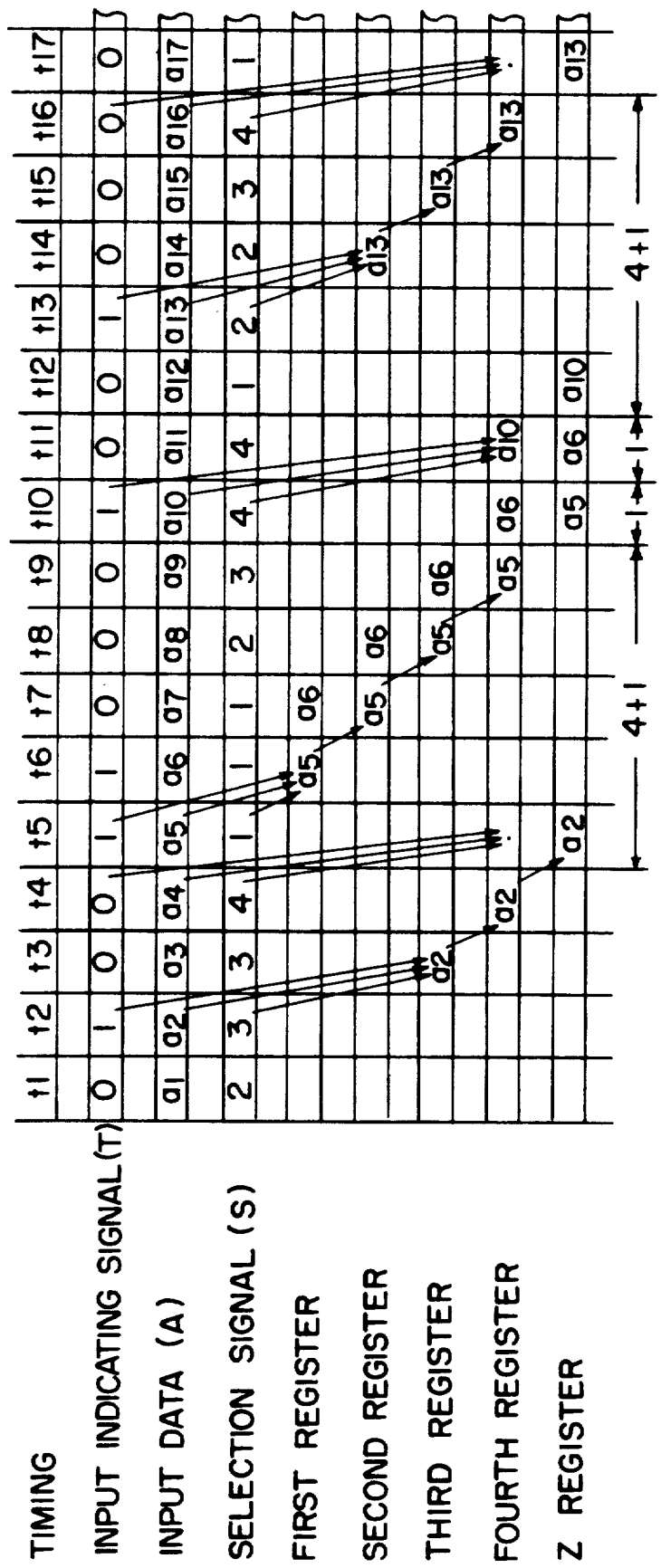
FIG. 11 is a time chart illustrating the operation within the pipeline circuit which is the third preferred embodiment of the invention.

In FIG. 11, input indicating signals T corresponding to the input serial data A=($a_1$, $a_2$, $a_3$, ...) are supposed to be (0, 1, 0, 0, 1, 1, 0, 0, 0, 1, 0, 0, 1, 0, 0, 0 0, ...). Thus $a_2$, $a_5$, $a_6$, $a_{10}$, and $a_{13}$, ... are valid data and, conversely, $a_1$, $a_3$, $a_4$, $a_7$, $a_8$, $a_9$, $a_{11}$, $a_{12}$, $a_{14}$, $a_{15}$, $a_{16}$, $a_{17}$, ... are invalid data.

Furthermore, the timing at which the first elemental datum $a_1$ of the input data series A entered should be t1, and the selection signal S at that time, should indicate "2". Before the datum $a_1$ is entered, i.e. before timing t1, the selection signal S periodically varies to indicate one of four recurring values, 1, 2, 3, 4, 1, 2, 3, 4 and 1, ... until it indicates "2" at timing t1.

Referring to FIG. 11, the datum $a_1$ inputted at timing t1 is not entered into the second register RG2 and is invalidated instead, because although the selection signal S is "2" at that time, the input indicating signal is invalid (logical "0"). The selection signal S at timing t2 indicates "3", the next value of the selection signal S (=2) of timing t1 in response to the input indicating signal T (=0) at the preceding timing t1.

Then, the datum $a_2$ inputted at timing t2 is entered into the third register RG3 in response to the selection signal S (=3) at that time because the input indicating signal T is valid (logical "1"), and stored at the next timing t3. The selection signal S at timing t3 holds the selection signal S (=3) of timing t2 in response to the input indicating signal T (=1) at the preceding timing t2.

In response to the selection signal S (=3) of timing t3, the output datum $a_2$ of the third register RG3 is entered into the fourth register RG4, and stored at the next timing t4.

Further, the datum a₃ entered at timing t3 is not entered into the third register RG3 at timing t3 and instead is invalidated, although the selection signal S at that time indicates "3", because the input indicating signal T indicates "0". The selection signal S at timing t4, in response to the input indicating signal T ($=0$) of timing t3 and the selection signal of "3", indicates the next value "4".

The datum a₄ entered at timing t4 is not entered into the fourth register RG4 and is invalidated instead because the selection signal S and input indicating signal T at that time are "4" and "0", respectively. The selection signal S at timing t5, in response to the input indicating signal T ($=0$) and the selection signal of "4" at timing t4, indicates the next value "1".

Similar operations are repeated at and after timing t5, and into the fourth register RG4, (which is also the output register of the pipeline circuit 3000), are stored the data $a_2, a_5, a_6, a_{10}, a_{13}, \ldots$ at timings t4, t9, t10, t11, t16 . . . , respectively, each to become an element datum of the output data series Y of the pipeline circuit 3000, and stored into the Z register 103 at the timings t5, t10, t11, t12, t17 . . ., respectively.

Here, the intervals of the output timings of the valid data $a_2, a_5, a_6, a_{10}, a_{13}, \ldots$ among the elemental data of the input data series $A = (a_1, a_2, a_3, \ldots)$ are $4 \times k + 1$ timing cycles (k is an integer), such as $5 (=4 \times 1 + 1)$ timing cycles between the data $a_2$ and $a_5$, $1 (=4 \times 0 + 1)$ timing cycle between the data $a_5$ and $a_6$, 1 timing cycle between the data $a_6$ and $a_{10}$, 5 timing cycles between the data $a_{10}$ and $a_{13}, \ldots$ If the pipeline circuit 3000 is used as the pipeline circuits 901 and 902 in FIG. 8, said Z register 103 will correspond to the input registers R1A and R1B. Now with reference to the time chart of FIG. 12, an example of the operation of the pipeline circuit 902 will be described where a reference timing cycle "1" of the input crossbar 903 is assigned to the input register R1A, another reference timing cycle "3" of same, to the input register R1B, and timing t5 shown in FIG. 11 (the timing at which the data $a_2$ is stored into the Z register 103, i.e. the input register R1A) coincides with the crossbar reference timing "1" (namely the operation shown in FIG. 11 is that of the pipeline circuit 901).

Figure 12:
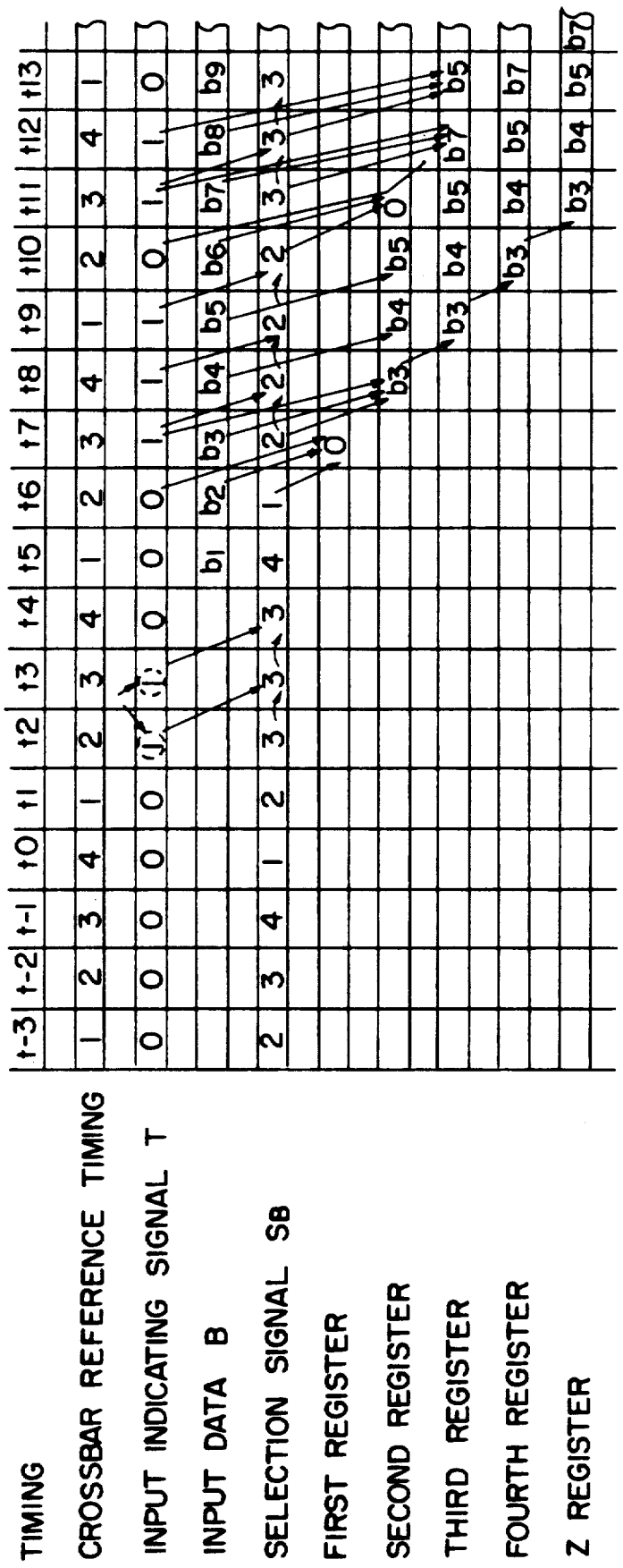
FIG. 12 is a time chart illustrating one example of method to stagger the operating timings of the pipeline circuit illustrated in FIG. 10.

Referring now to FIG. 12, at timings before timing t0, a selection signal $S_B$ varies one timing cycle ahead of the crossbar reference timing. Thus, if the first valid datum is inputted (accompanied by the input indicating signal T ($=1$)) in this state, the valid datum will be stored into the Z register 103 (i.e. the input register R1B) when the crossbar reference timing is "1". Since the crossbar reference timing of "3" is assigned to the input register R1B whose inputs are the data series B as stated above, the operating timing has to be shifted.

If, for instance, a dummy input indicating signal T = 1 is inputted twice at timings preceding the inputting of the first valid datum, the pipeline circuit 902 can store the first valid datum into the input register R1B when the crossbar reference timing is "3". Thus, referring to FIG. 12, by inputting the dummy input indicating signal T = 1 at timings t2 and t3, the pipeline circuit 902 will be standing by at timing t4 in a state one timing cycle behind the crossbar reference timing.

If, in that state, the input data series B ($=b_1, b_2, b_3, \ldots$) and the input indicating signals T ($=0, 0, 1, 1, 1, 0, 1, 1, 0, 0, 0, 1, \ldots$) corresponding to the data entered from timing t5 on, the pipeline circuit 902 will operate in the same manner as the pipeline circuit described with reference to FIG. 2. The data $b_3, b_4, b_5, b_7, b_8, \ldots$ will be stored in the fourth register, which is also an output register of the pipeline circuit 902, at timings t10, t11, t12, t13, t14 . . . , respectively, and will be stored into the Z register, i.e. the input register R1B, at the timings t11, t12, t13, t14, t15, . . . , respectively.

The data entered into the input registers R1A and R1B by the operations illustrated in FIGS. 11 and 12 are further entered into the banks BANK1, BANK2, BANK3 and BANK4 of the memory 904 by the operation shown in the time chart of FIG. 4.

As stated above, a reference timing cycle of "1" is assigned to the input register R1A, and one of "3" to the input register R1B. The output register ROR1 selects and enters an output datum of the input register R1A when the reference timing cycle is "1"; stores it when the cycle is "2"; selects and enters an output datum of the input register R1B while holding the preceding datum when the cycle is "3"; stores it when the cycle is "4"; selects and enters another output datum of the input register R1A while holding the preceding datum when the cycle is again "1"; stores it when the cycle is again "2", . . . . . . , and repeats these same operations in the four timing cycles. As also described above, the output register ROR2 operates in the same manner as the output register ROR1 except that the former is one timing cycle behind the latter. Thus, it repeats in four timing cycles the operations of selecting and entering an output datum of the input register R1A, storing it at the next timing when the reference timing cycle is "2", selecting and entering an output datum of the input register R1B, and storing it at the next timing when the reference timing cycle is "4". The output register ROR3 operates in the same manner as the output register ROR2 except that the former is another timing cycle behind the latter, and this correspondingly applies to the output register ROR4.

Figure 13:
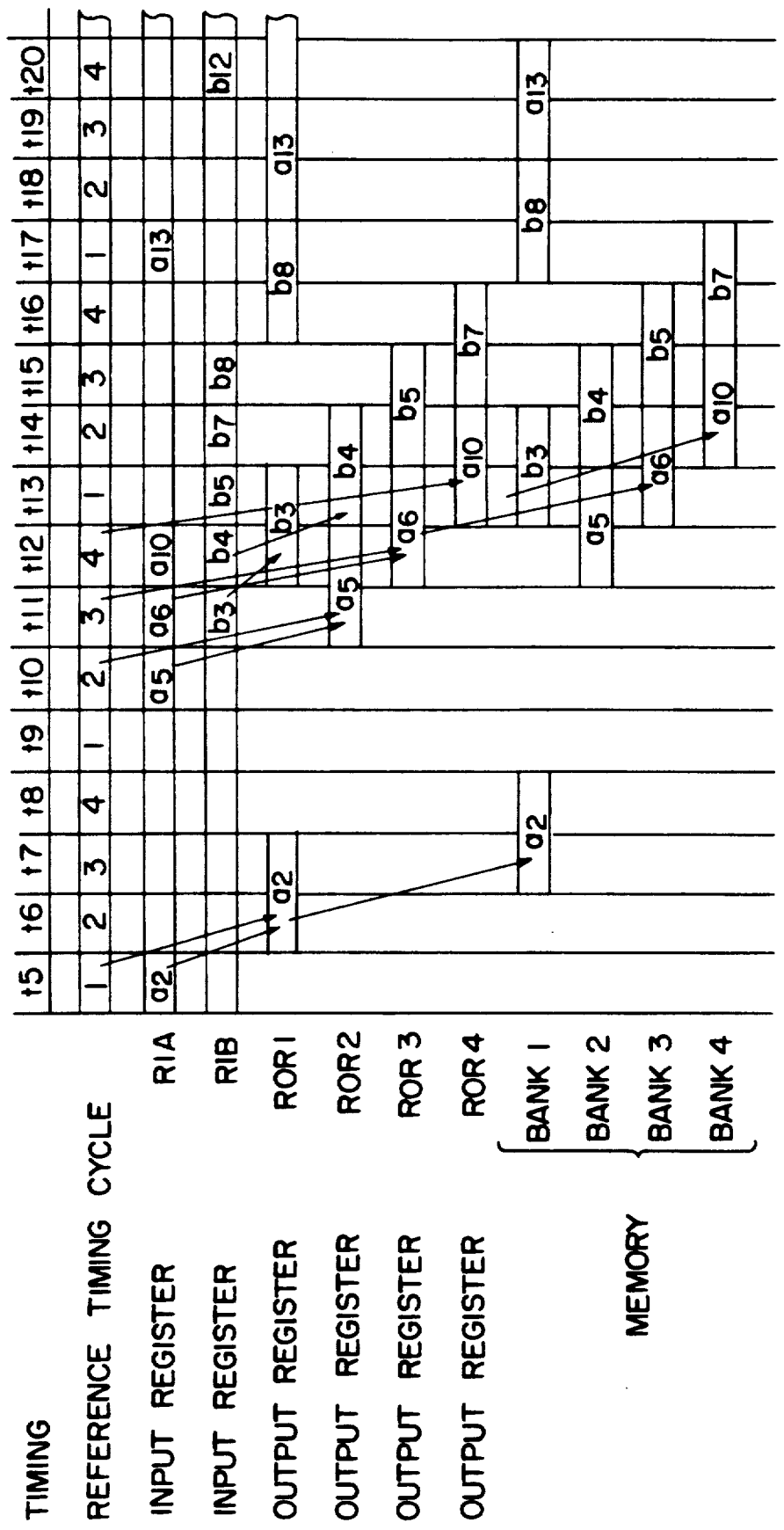
FIG. 13 is a timing chart illustrating an example of the operation of an input crossbar using an output from the pipeline circuit which is the third preferred embodiment of the invention.

As a result of these operations, as shown in FIG. 13, the datum $a_2$ stored into the input register R1A at timing t5 is stored into the output register ROR1 at timing t6 when the reference timing cycle is "1", the datum $a_5$ stored into the input register R1A at timing t10 is stored into the output register ROR2 at timing t11 when the reference timing cycle is "2"; and the data $a_2$ and $b_3$ stored into the input registers R1A and R1B at timing t11 are stored into the output registers ROR3 and ROR1, respectively, at timing t12 when the reference timing cycle is "3". Similar operations are repeated thereafter, and the data $a_2, b_3, b_8, a_{13} \ldots$ are entered in the bank BANK1 of the memory via the output register ROR1, the data $a_5, b_4, \ldots$ are entered into the bank BANK2 of the memory via the output register ROR2, the data $a_6, b_5, \ldots$ are entered into the bank BANK3 of the memory via the output register ROR3, and the data $a_{10}, b_7, \ldots$ are entered into the bank BANK4 of the memory via the output register ROR4.

To consider here a serial data D ($=d_1, d_2, d_3, d_4, d_5, \ldots = a_2, a_5, a_6, a_{10}, a_{13}, \ldots$) comprising only valid data from the data series A ($=a_1, a_2, a_3, \ldots$) and a data series F ($=f_1, f_2, f_3, f_4, f_5, \ldots = b_3, b_4, b_5, b_7, b_8, \ldots$) comprising only valid data from the data series B ($=b_1, b_2, b_3, \ldots$), it is seen that the $4 \times k + 1$-th (k is an integer) data $d_1 (=a_2), f_1 (=b_3), d_5 (=a_{13}), f_5 (=b_8), \ldots$ of the data series D and F are entered into the bank BANK1 of the memory; the $4 \times k + 2$-th (k is an integer) data $d_2 (=a_5), f_2 (=b_4), \ldots$ of the data series D and F, into the bank BANK2 of the memory; the $4\times k+3$-th data $d_3$ ($=a_6$), $f_3$ ($=b_5$), . . . of the data series D and F, into the bank BANK3 of the memory; and the $4\times k+4$-th data $d_4$ ($=a_{10}$), $f_4$ ($=b_7$), . . . of the data series D and F, into the bank BANK4 of the memory.

Thus it is seen that the pipeline circuit according to the present invention is effective for adjusting the timing to supply data, even if the input data include invalid data, to an interleave type processing apparatus in a sequence of valid data only.

Figure 14:
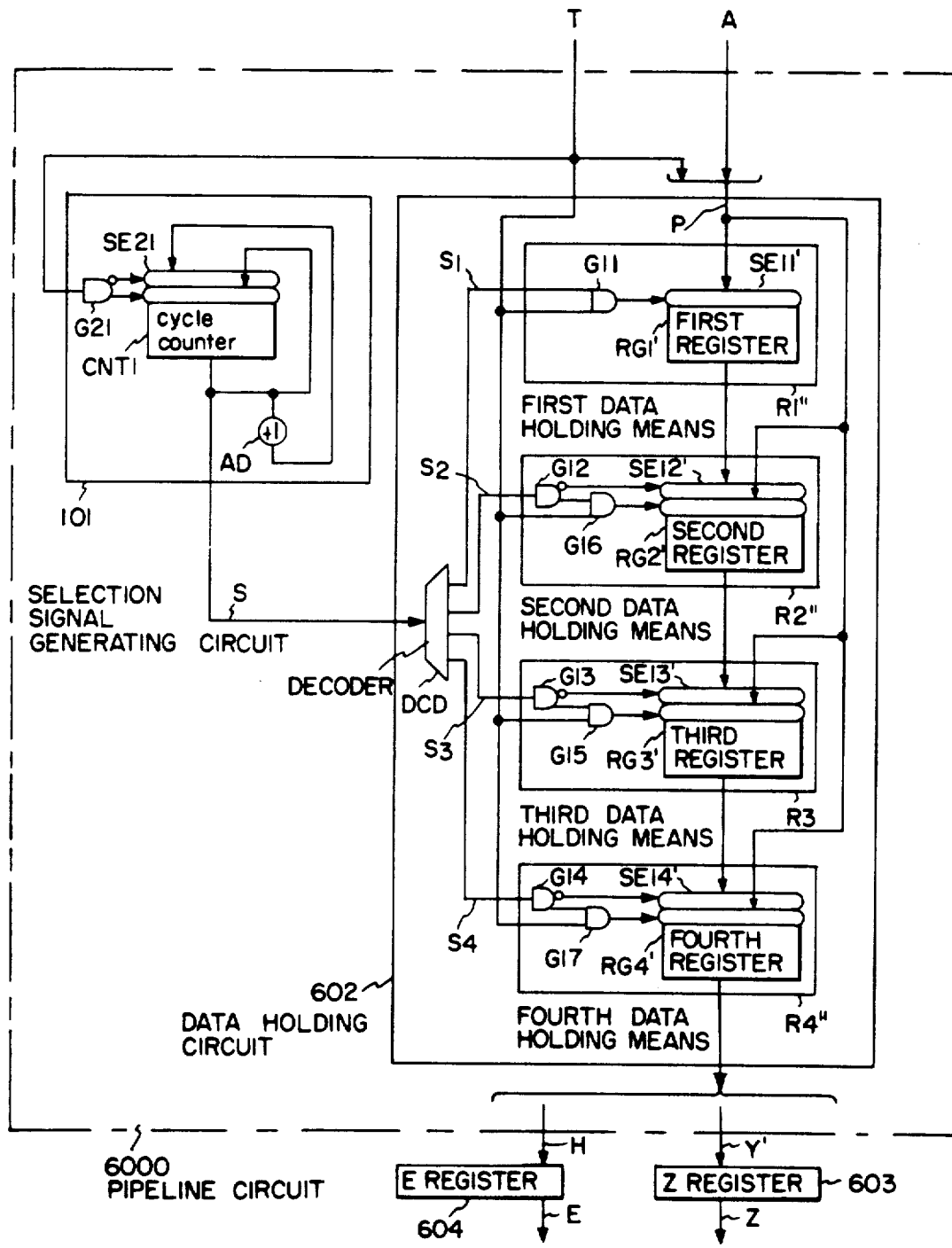
FIG. 14 is a block diagram of a fourth preferred embodiment of the invention.

FIG. 14 is a block diagram of a fourth preferred embodiment of the present invention, where the advantage of the pipeline circuit according to the invention is increased by having not only the input serial data A but also the input indicating signals T, as referred to in the third embodiment shown in FIG. 10, inputted to a data holding circuit. In FIG. 14, the same reference numerals as in FIG. 10 denote respectively the same constituent elements.

Referring to FIG. 14, a pipeline circuit 6000 has input indicating signals T and a serial data A ($=a_1, a_2, \ldots, a_m$), and supplies output indicating signals H and a data series Y.

The data holding circuit 502 receives the inputting of a selection signal S from a selection signal generating circuit 101, decodes it with a decoder DCD into selection signals $S_1, S_2, S_3$ and $S_4$ for four stages of data holding means $R1'', R2'', R3''$ and $R4''$, respectively, and stores data P, each of which consists of a pair of one of the data A and an input indicating signal T corresponding to that datum, into one of the four-stage data holding means $R1'', R2'', R3''$ and $R4''$. If, for instance, the selection signal $S_3$ out of the selection signals $S_1, S_2, S_3$ and $S_4$ is valid, the data P will be stored into the data holding means $R3''$. Note, however that the data P will be invalidated and not stored into the data holding means $R3''$ if the input indicating signal indicates invalidity (logical "0" for instance). The data P stored in the data holding means $R3''$ when the input indicating signal T indicates validity (logical "1" for instance) are stored into the data holding means $R4''$ one timing cycle later and become the output data of the data holding circuit 602, i.e. of the pipeline circuit 6000. There are a Z register 603 and an E register 604 for respectively storing output data Y, which correspond to the input data A of the output data of the data holding circuit 602, and data H corresponding to the input indicating signals T of the same, and outputting them as data Z and E.

As the data Y outputted from the data holding circuit 602 at the timings at which the output data H, (namely, the output data E of the E register 604 indicate validity, i.e. the output data Z of the Z register 603), are always valid, the data H can be used as control signals for the data Y (for instance as write enable signals or the like) in another circuit downstream.

Other parts of the pipeline circuit 6000 are equivalent to those of the pipeline circuit 3000 of FIG. 10.

Figure 15:
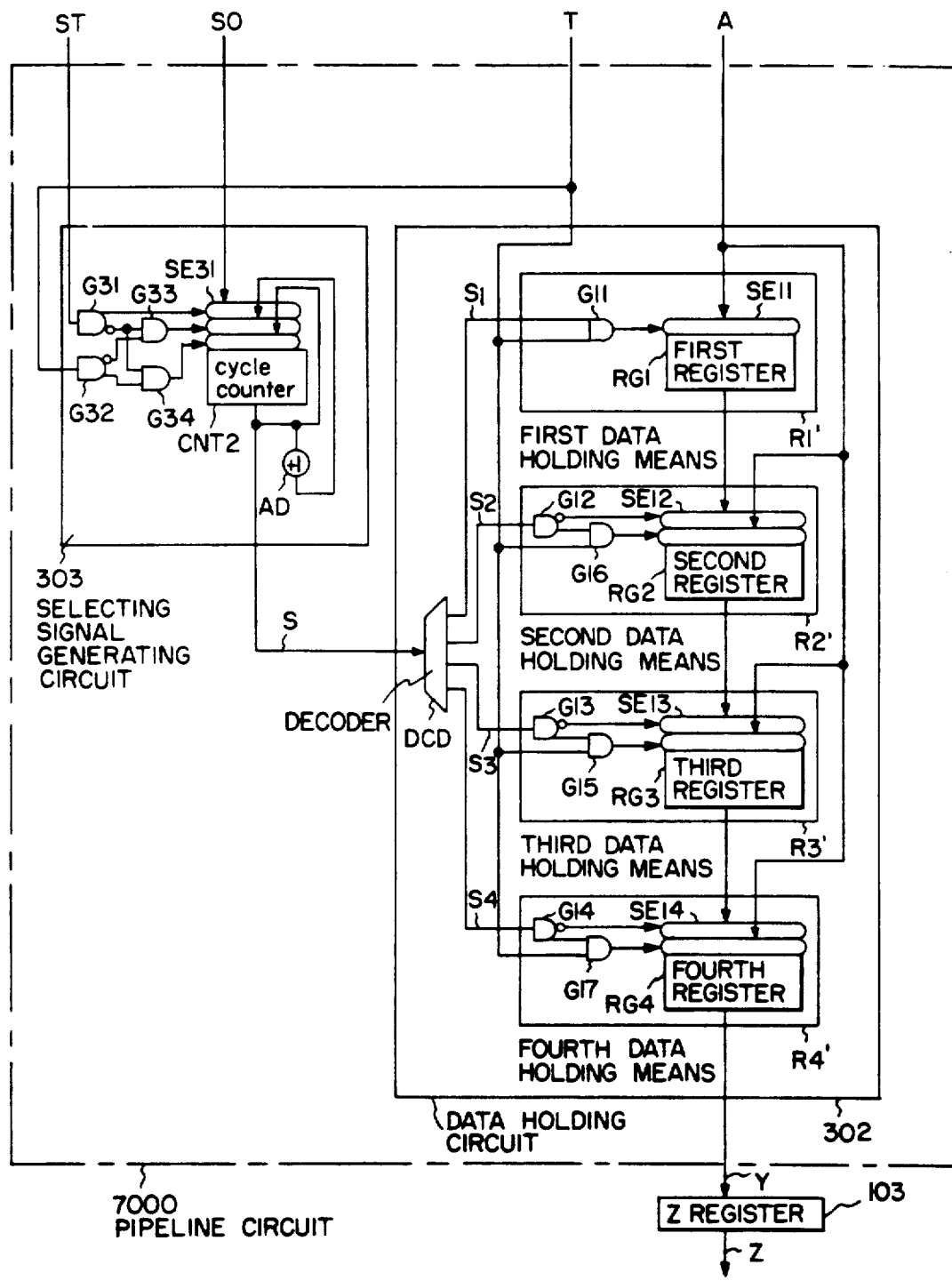
FIG. 15 is a block diagram of a fifth preferred embodiment of the invention.

FIG. 15 is a block diagram of a fifth preferred embodiment of the present invention, where the advantage of the pipeline circuit according to the invention is increased by inputting not only the input serial data A and the input indicating signals T, as referred to in the third embodiment shown in FIG. 10, but also a selection signal initial value S0 and an initial value setting indicating signal ST. Equivalent constituent elements to those in FIG. 10 are denoted by the same respective reference numerals.

Referring to FIG. 15, a selection signal generating circuit 303, which has the selection signal initial value S0, the initial value setting indicating signal ST and the input indicating signal T as inputs, outputs the selection signal initial value S0 as the selection signal S of the next timing when the initial value setting indicating signal ST indicates validity; generates and outputs the selection signal indicating the value next to what was indicated by the preceding selection signal S out of the four periodic values 1, 2, 3, 4, 1, 2, . . . when both the initial value setting indicating signal ST and the input indicating signal T indicate invalidity; and holds the value indicated by the preceding selection signal S when the initial value setting indicating signal ST and the input indicating signal T indicate invalidity and validity, respectively.

The selection signal generating circuit 303 referred to above can be realized, as illustrated, with a cycle counter CNT2 having a three-input one-output selecting circuit SE31, whose first, second and third stage input are respectively supplied with the selection signal initial value S0, the output of a +1 circuit AD and the current value of the selection signal S; a gate G31, which provides the initial value setting indicating signal ST to the first stage of the selecting circuit SE31 and at the same time generates its inverted signal; a gate G32 which outputs the input indicating signal T and its inverted signal; a gate G33 which provides the logical product of the inverted signal of the initial value setting indicating signal ST and that of the input indicating signal T to the second stage of the selecting circuit SE31; and a gate G34 which provides the logical product of the inverted signal of the initial value setting indicating signal ST and the input indicating signal T to the third stage of the selecting circuit SE31. This cycle counter CNT2 varies the value of the selection signal in synchronism with the timing cycle by selecting the value of the selection signal initial value S0, if the initial value setting indicating signal ST indicates "1", the value "S+1" if both the initial value setting indicating signal ST and the input indicating signal T indicate "0", or the value "S" if the initial value setting indicating signal ST indicates "0" and the input indicating signal T indicates "1". This selection signal S can indicate one of four values, 1, 2, 3 and 4.

Other parts of the pipeline circuit 7000 are equivalent to those of the pipeline circuit 3000 of FIG. 10.

The pipeline circuit 7000 described above, if used, for instance, as the pipeline circuit 902 described with reference to FIGS. 12 and 8, can adjust the timing of the selecting signal S, so that the first valid datum can be stored into the input register RIB when the crossbar reference timing is "3", by inputting a value one timing cycle behind the crossbar reference timing as the selection signal initial value S0 together with the initial value setting indicating signal ST.

Figure 16:
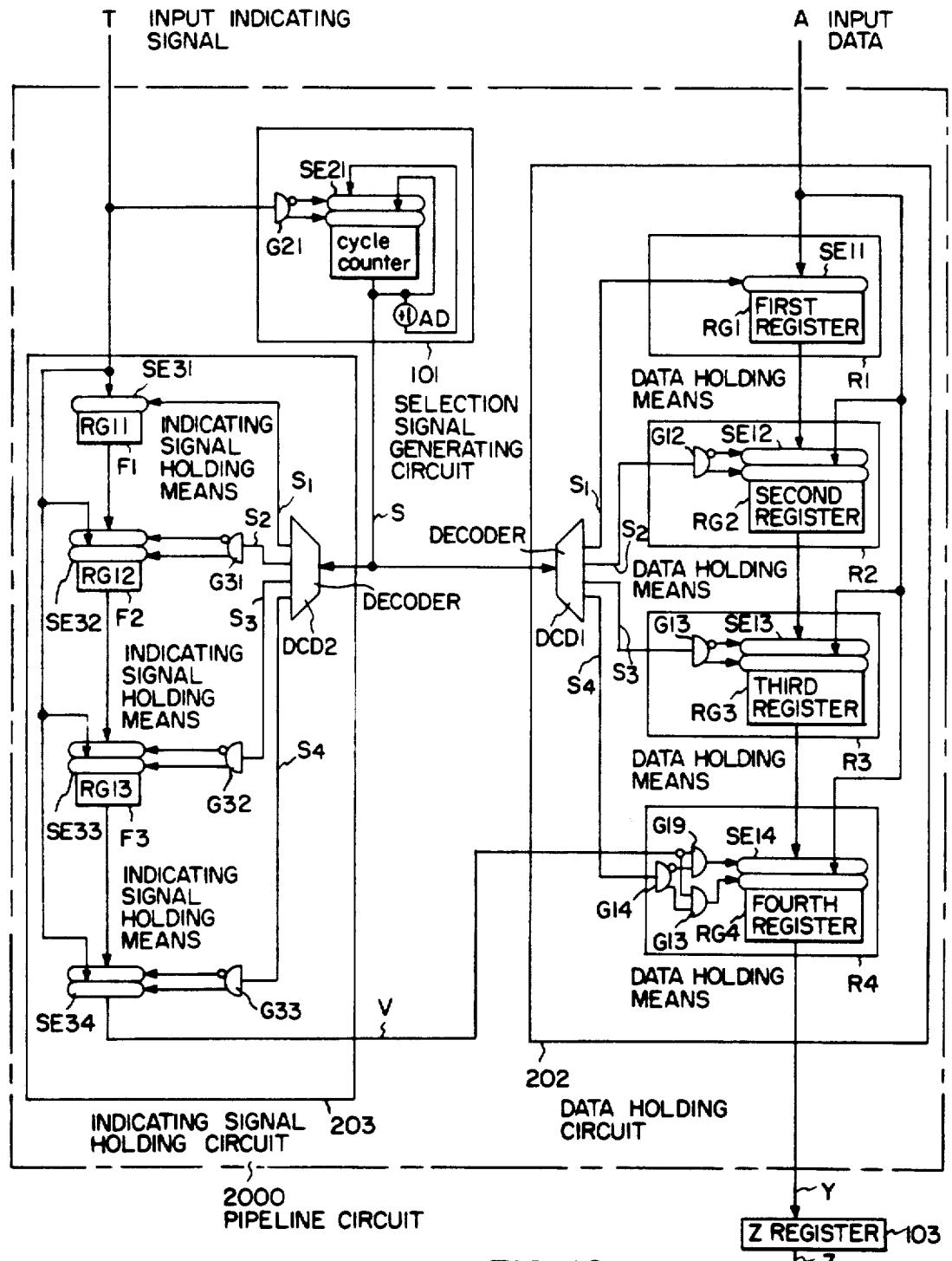
FIG. 16 is a block diagram of a sixth preferred embodiment of the invention.

Now referring to FIG. 16, a pipeline circuit 2000 has input indicating signals T and a serial data A ($=a_1, a_2, \ldots, a_m$), and outputs a serial data Y.

The data holding circuit 202 receives the inputting of a selection signal S from a selection signal generating circuit 101, decodes it with a decoder DCD1 into selection signals $S_1, S_2, S_3$ and $S_4$ for four stages of data holding means R1, R2, R3 and $R4''$, respectively, and stores input data A into one of the four-stage data holding means R1, R2, R3 and $R4''$. If, for instance, the selection signal $S_3$ out of the selection signals $S_1, S_2, S_3$ and $S_4$ is valid (logical "1" for instance), the data A will be stored into the data holding means R3. If, however, the selection signal S is invalidated when the output indicating signal from an indicating signal holding circuit 203 is invalid (logical "0" for example), the data A will not be stored into the data holding means R4", but instead will be invalidated. The data A stored in the data holding means R3 are stored into the data holding means R4" one timing cycle later to be supplied as the output data of the data holding circuit 202, i.e. the output data Y of the pipeline circuit 2000. If, however, the output indicating signal V one timing cycle later than the timing at which the data A were stored into the data holding means R3 indicates invalidity, the output data of the data holding means R3 will not be stored into the data holding means R4", but instead will be invalidated.

The data holding means R2, as illustrated, can be realized with a register RG2 having a two-input one-output selecting circuit SE12, whose first and second stage inputs are supplied with the output of the data holding means R1 and the input data A respectively, and a gate G12, which provides the inverted signal of the selection signal $S_2$ to the first stage of the selecting circuit SE12 and at the same time the uninverted selection signal $S_2$ to the second stage of the selecting circuit SE12. It selects and stores the data A when the selecting signal $S_2$ is valid or the output data of the data holding means R1 when the selection signal $S_2$ is invalid (logical "0").

The data holding means R3 and R4, like the data holding means R2, can be respectively realized with registers RG3 each having two-input one-output selecting circuits SE13, whose first and second stage inputs are supplied with the outputs of the preceding-stage data holding means R2 and the input data A, respectively, and a gate G13, which provides the inverted signal of the selection signal $S_3$ to the first stage of the selecting circuit SE13 and at the same time the uninverted selection signal $S_3$ to the second stage of the selecting circuit SE13. The data holding means R1 can be realized with a register RG1 having a selecting circuit SE11, which outputs the data A when the selection signal $S_1$ is valid and stores the data A through this selecting circuit SE11.

The data holding means R4" can be realized with a register RG4 having a two-input one-output selecting circuit SE12, whose first and second stage inputs are respectively supplied with the output of the preceding-stage data holding means R3 and the input data A; a gate G14 which supplies the selection signal $S_4$ and its inversion output; a gate G19 which obtains the logical product of the output indicating signal V and the inversion output of said selection signal and supplies the output to the first stage of the selecting circuit SE14; and a gate G18 which obtains the logical product of the selection signal $S_4$ and the output indicating signal V and supplies the output to the second stage of the selecting circuit SE14. If the selection signal $S_4$ is valid (logical "1") and the output indicating signal V is also valid (logical "1"), the output of the gate G18 is validated, and the second stage of the selecting circuit SE14 is selected, so that the data A are stored into the register RG4; if the selecting signal $S_4$ is invalid (logical "0") and the output indicating signal V is valid, the output of the gate G19 is validated and the first stage of the selecting circuit SE14 is selected, so that the output data of the data holding means R3 are stored into the register RG4; or if the output indicating signal V is invalid, none is stored and the input data are invalidated (all the bits are "0" for instance).

If the input indicating signal T, corresponding to the data A, indicates invalidity (logical "0"), the selection signal generating circuit 101 generates and outputs a selection signal S indicating the value next to that indicated by the preceding selection signal S out of four periodic values 1, 2, 3, 4, 1, 2, . . . So, for instance, if an input indicating signal T = 0 is inputted when the selection signal S indicates "1", the selection signal S will indicate "2" at the next timing. Similarly, if an input indicating signal T = 0 is inputted when the selection signal S indicates "2", the selection signal S will indicate "3" at the next timing; if an input indicating signal T = 0 is inputted when the selection signal S indicates "3", the selection signal S will indicate "4" at the next timing, and if an input indicating signal T = 0 is inputted when the selection signal S indicates "4", the selection signal S will indicate "1" at the next timing.

Conversely, if the input indicating signal T indicates validity (logical "1"), the selection signal generating circuit 101 will hold the value indicated by the preceding selection signal S. If, for instance, an input indicating signal T = 1 is inputted when the selection signal S indicates "1", the selection signal S will indicate "1" at the next timing, too.

The selection signal generating circuit 101 referred to above, as illustrated, can be realized with a cycle counter CNT1 having a two-input one-output selecting circuit SE21 to whose first and second stage inputs are supplied the output of a +1 circuit AD and the current value of the selection signal S, respectively, and a gate G21, which provides the inverted signal of the input indicating signal T to the first stage of the selecting circuit SE21 and at the same time the uninverted input indicating signal to the second stage of the selecting circuit SE21. This cycle counter CNT1 varies the value of the selection signal in synchronism with the timing cycle by selecting the value "S+1", which is the output of the +1 circuit AD, when the input indicating signal T indicates "0", or the value "S" when the input indicating signal indicates "1". This selection signal S can indicate one of four values, 1, 2, 3 and 4.

The indicating signal holding circuit 203 receives the input of the selection signal S, from which it (with a decoder DCD2) generates selection signals $S_1$, $S_2$ and $S_3$ for three stages of indicating signal holding means F1, F2 and F3, respectively, and a selection signal $S_4$ for a selecting circuit SE34 for supplying the output indicating signal V. Circuit 203 decides whether to store the input indicating signal T into one of the three-stage indicating signal holding means F1, F2 and F3 or to supply it as the output indicating signal V. If the selection signal $S_3$ for instance, from the selection signals $S_1$, $S_2$, $S_3$ and $S_4$ is valid, the input indicating signal T is stored into the indicating signal holding means F3. The input indicating signal T, stored into the indicating signal holding means F3, is supplied one timing cycle later from the selecting circuit SE34 as the output indicating signal V. If the selection signal $S_4$ out of the selection signals $S_1$, $S_2$, $S_3$ and $S_4$ is valid, the input indicating signal T will be directly supplied as the output indicating signal V from the selecting circuit SE34.

The indicating signal holding means F2, for instance, can be realized as illustrated with a register RG12 having a two-input one-output selecting circuit SE32, whose first and second stage inputs are respectively supplied with the output of the preceding-stage indicating signal holding means F1 and the input indicating signal T, and a gate G31, which provides the inverted signal of the selection signal $S_2$ to the first stage of the selecting circuit SE31, while simultaneously providing the uninverted selection signal $S_2$ to the second stage of the selecting circuit SE31. It selects and stores the input indicating signal T if the selection signal S2 is effective (logical "1") or the output data of the indicating signal holding means F1 if the selection signal $S_2$ is invalid (logical "0").

The indicating signal holding means F3, like the indicating signal holding means F2, can be realized with a register RG13 having a two-input one-output selecting circuit SE33, whose first and second-stage inputs are supplied with the output of the preceding-stage indicating signal holding means F2 and the input indicating signal T, respectively, and with a gate G32, which provides the inverted signal of the selection signal $S_3$ to the first stage of the selecting circuit SE33 and at the same time the uninverted selection signal $S_3$ to the second stage of the selection signal $S_3$. The indicating signal holding means F1 can be realized with a register RG11 having a selecting circuit SE31 which outputs the input indicating signal T when the selection signal $S_1$ is valid and stores the input indicating signal T through the selecting circuit SE31. Further, a gate G33 supplies the inverted signal of the selection signal $S_4$ to the first stage of a selecting circuit SE34 and at the same time the uninverted selection signal $S_4$ to the second stage of the selecting circuit. The selecting circuit SE34 supplies the output of the indicating signal holding means F3 as the output indicating signal V when the first stage is selected by the gate G33 or the input indicating signal T as the output indicating signal V when the second stage is selected.

The operation of the pipeline circuit 2000 will be described below with reference to the time chart of FIG. 17, in which said registers RG1 to RG4 in the data holding means R1, R2, R3 and R4 are represented by first, second, third and fourth registers, respectively, and a register, represented by a Z register 204, receives the input and stores the output of data Y of the pipeline circuit 2000 and outputs this data as data Z.

Figure 17:
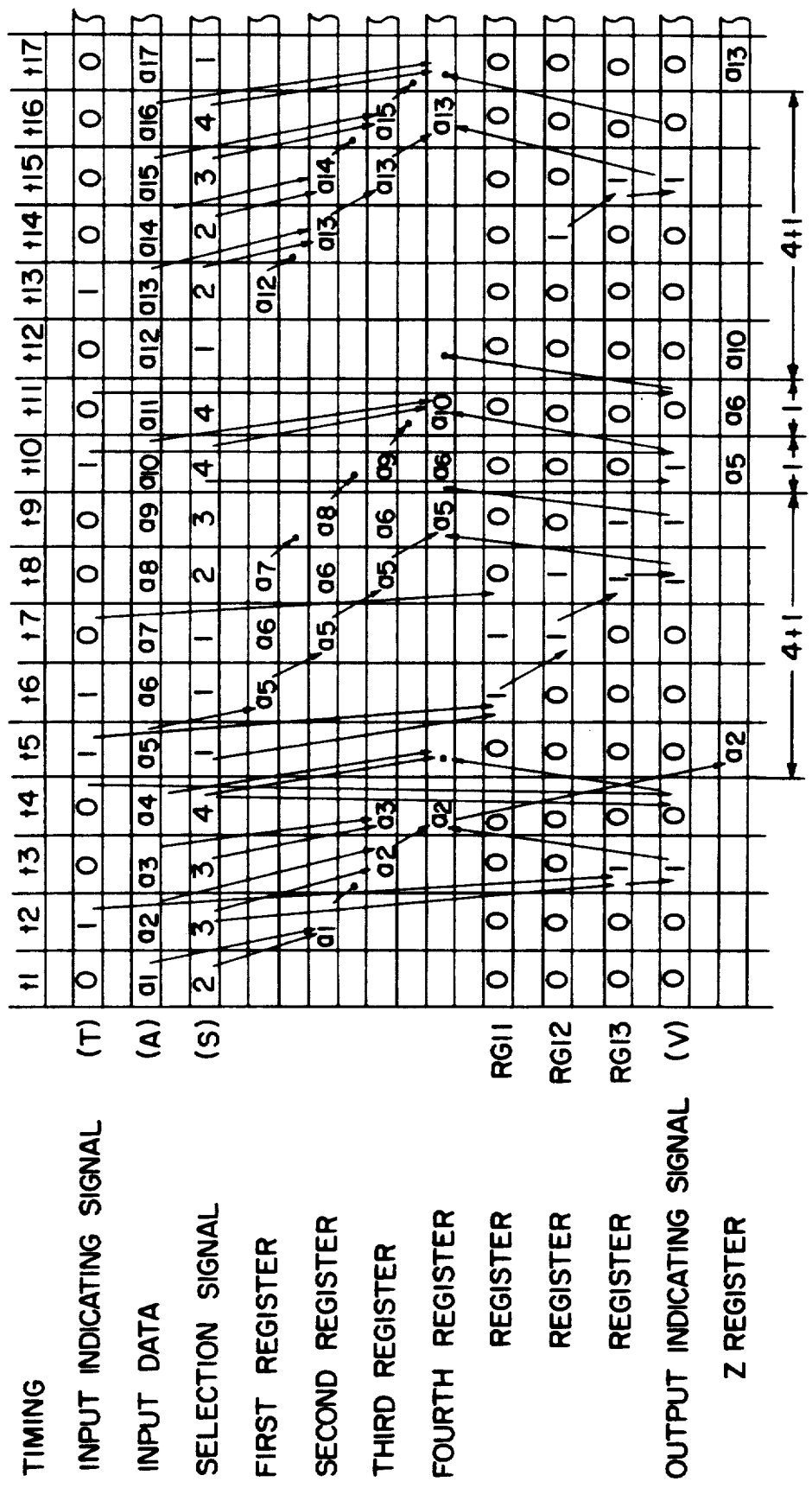
FIG. 17 is a time chart illustrating the operation within the pipeline circuit which is the sixth preferred embodiment of the invention.

In FIG. 17, input indicating signals T corresponding to the input data series $A = (a_1, a_2, a_3, \ldots)$ are supposed to be $(0, 1, 0, 0, 1, 1, 0, 0, 0, 1, 0, 0, 1, 0, 0, 0, 0, \ldots)$. Thus $a_2, a_5, a_6, a_{10}, a_{13}, \ldots$ are valid data and, conversely, $a_1, a_3, a_4, a_7, a_8, a_9, a_{11}, a_{12}, a_{14}, a_{15}, a_{16}, a_{17}, \ldots$ are invalid data.

Further, the timing at which the first elemental datum $a_1$ of the input data series A is entered is t1, and the selection signal S at that time, is supposed to be "2". Before the datum a is entered, i.e. before timing t1, the selection signal S periodically varies to indicate one or another of four recurring values, 1, 2, 3, 4, 1, 2, 3, 4, 1, ... until it indicates "2" at timing t1.

Referring to FIG. 17, the datum $a_1$ inputted at timing t1 is entered into the second register RG2 and stored at the next timing t2. The selection signal S at timing t2 indicates "3", the value following that of the selection signal S ($= 2$) of timing t1 in response to the input indicating signal T ($= 0$) at the preceding timing t1.

Then, the datum $a_2$ inputted at timing t2 is entered into the third register RG3 in response to the selection signal S ($= 3$) at timing t2 and stored at the next timing t3. The datum $a_1$ stored into the second register RG2 at timing t2 is not stored into the third register RG3 but instead invalidated at timing t3. The selection signal S at timing t3 holds the selection signal S ($= 3$) of timing t2 in response to the input indicating signal T ($= 1$) at the preceding timing t2.

Meanwhile, the input indicating signal T ($= 1$) of timing t2 is inputted to the register RG13 in response to the selection signal S ($= 3$) at timing t2 and stored at the next timing t3. As the selecting circuit SE34 selects the output of the register RG13 in response to the selection signal S ($= 3 \neq 4$) at timing t3, the output indicating signal V is validated (logical "1").

In response to the selection signal S ($= 3$) of timing t3, the output datum $a_2$ of the third register RG3 is entered into the fourth register RG4, and stored at the next timing t4.

Further, the datum $a_3$ entered at timing t3 is entered into the third register RG3 in response to the selection signal S ($= 3$) at that time and stored at the next timing t4. The selection signal S at timing t4, in response to the input indicating signal T ($= 0$) of timing t3 and the selection signal of "3", indicates the next value "4".

The datum $a_4$ entered at timing t4 is not entered into the fourth register RG4 and is invalidated instead because the selection signal S and input indicating signal T at timing t4 are "4" and "0", respectively. The selection signal S at timing t5, in response to the input indicating signal T ($= 0$) and the selection signal ($= 4$) of timing t4, indicates the next value "1".

Similar operations are repeated at and after timing t5, and into the fourth register RG4 (which also is the output register of the pipeline circuit 2000) are stored the data $a_2, a_5, a_6, a_{10}, a_{13}, \ldots$ at timings t4, t9, t10, t11, t16..., respectively. Each of these data are to become an element datum of the output data series Y of the pipeline circuit 2000, and stored into the Z register 103 at the next timings t5, t10, t11, t12, t17..., respectively.

Here, the intervals of the output timings of the valid data $a_2, a_5, a_6, a_{10}, a_{13}, \ldots$ among the elemental data of the input data series $A = (a_1, a_2, a_3, \ldots)$ are $4 \times k + 1$ timing cycles (k is an integer), such as 5 ($= 4 \times 1 + 1$) timing cycles between the data $a_2$ and $a_5$, 1 ($= 4 \times 0 + 1$) timing cycle between the data $a_5$ and $a_6$, 1 timing cycle between the data $a_6$ and $a_{10}$, 5 timing cycles between the data $a_{10}$ and $a_{13}, \ldots$ If the pipeline circuit 2000 is used as the pipeline circuits 901 and 902 in FIG. 8, said Z register 103 will correspond to the input registers RIA and RIB.

Now, with reference to the time chart of FIG. 18, an example of the operation of the pipeline circuit 902 will be described, where a reference timing cycle "1" of the input crossbar 903 is assigned to the input register RIA, another reference timing cycle "3" of same, to the input register RIB, and timing t5 shown in FIG. 17 (the timing at which the data $a_2$ is stored into the Z register 103, i.e. the input register RIA) coincides with the crossbar reference timing "1" (namely the operation shown in FIG. 17 is that of the pipeline circuit 901).

Figure 18:
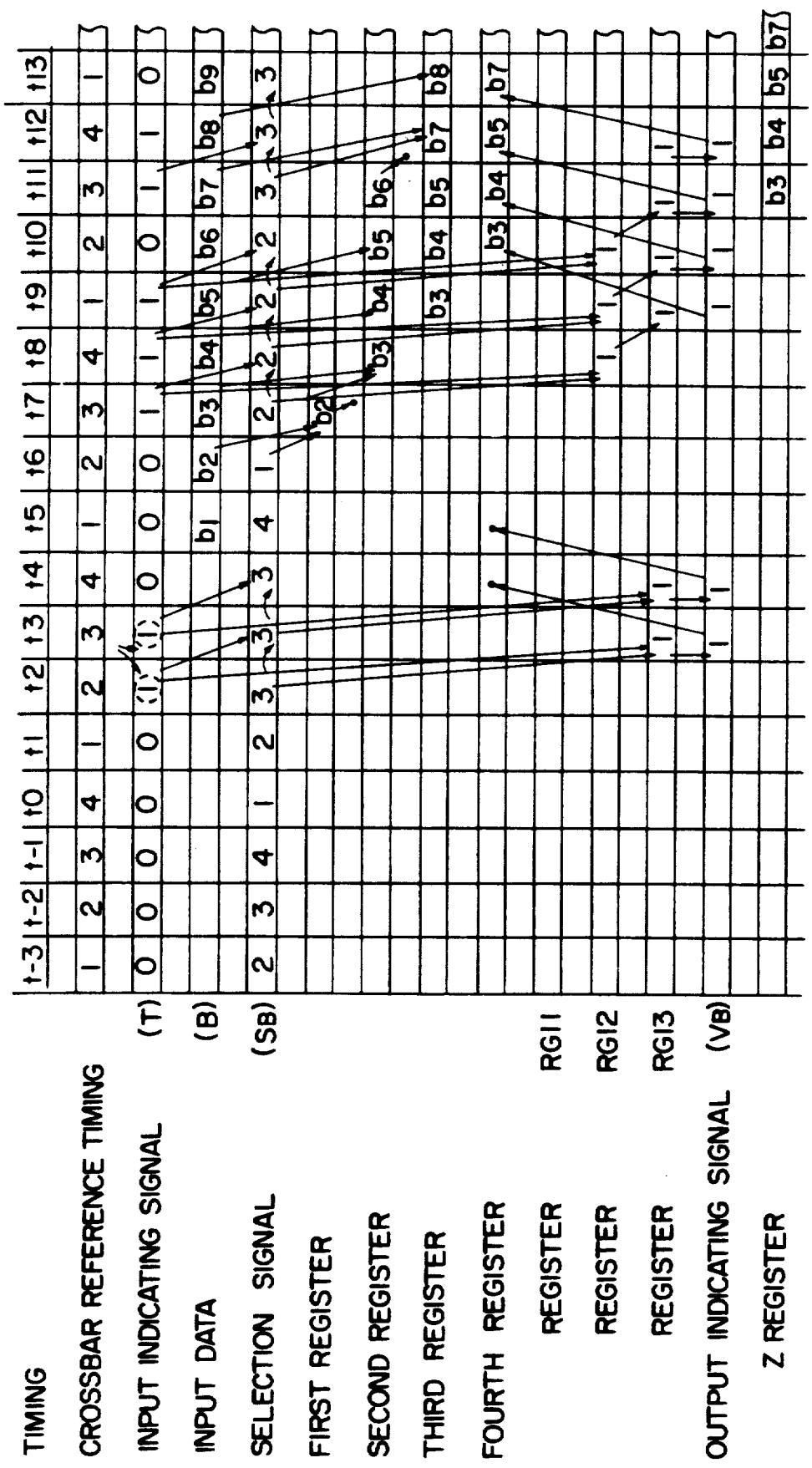
FIG. 18 is a time chart illustrating one example of method to stagger the operating timings of the pipeline circuit illustrated in FIG. 16.

Referring now to FIG. 18, at timings before timing t0, a selection signal $S_B$ varies one timing cycle ahead of the crossbar reference timing. Thus, if the first valid datum is inputted (accompanied by the input indicating signal T ($= 1$)) in this state, the valid datum will be stored into the Z register 103 (i.e. the input register RIB) when the crossbar reference timing is "1". Since the crossbar reference timing of "3" is assigned to the input register RIB whose inputs are the data series B as stated above the operating timing has to be shifted.

If, for instance, a dummy input indicating signal T ($= 1$) is inputted twice at timings preceding the inputting of the first valid datum, the pipeline circuit 902 can store the first valid datum into the input register RIB when the crossbar reference timing is "3". Thus, referring to FIG. 18, by inputting the dummy input indicating signal T (=1) at timings t2 and t3, the pipeline circuit 902 will be standing by at timing t4 in a state one timing cycle behind the crossbar reference timing.

If, in that state, the input data series B (=$b_1$, $b_2$, $b_3$, ...) and the input indicating signals T (=0, 0, 1, 1, 1, 0, 1, 1, 0, 0, 0, 1, ...) corresponding to the data are entered in from timing t5 on, the pipeline circuit 902 will operate in the same manner as the pipeline circuit described with reference to FIG. 17. The data $b_3$, $b_4$, $b_5$, $b_7$, $b_8$, ... will be stored in the fourth register, which is also an output register of the pipeline circuit 902, at timings t10, t11, t12, t13, t14 ..., respectively, and in the Z register, i.e. the input register RIB, at the respectively next timings t11, t12, t13, t14, t15, ...

Figure 19:
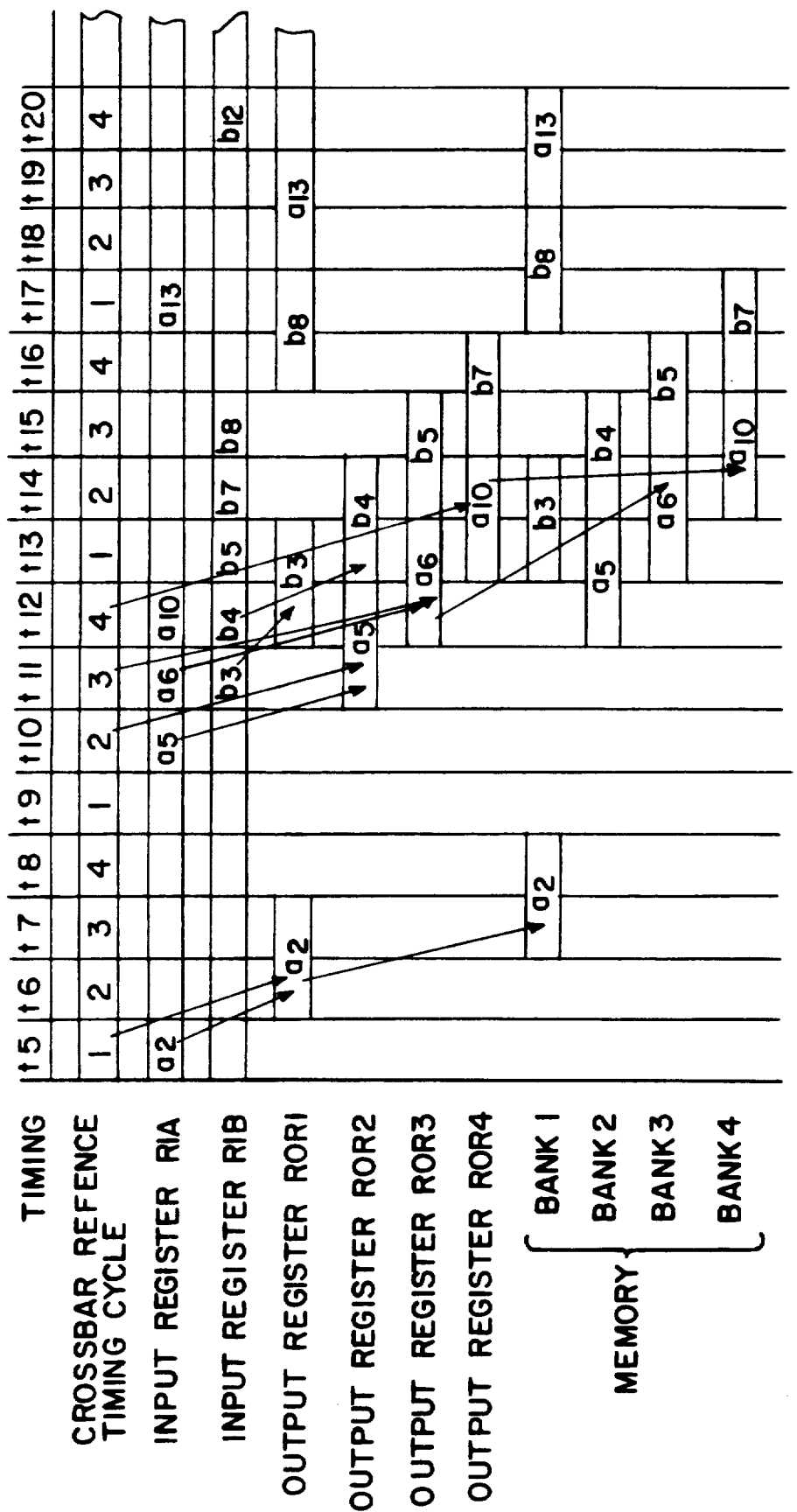
FIG. 19 is a timing chart illustrating an example of the operation of an input crossbar using an output from the pipeline circuit which is the sixth preferred embodiment of the invention.

The data entered into the input registers RIA and RIB by the operations illustrated in FIGS. 17 and 18 are further entered into the banks BANK1, BANK2, BANK3 and BANK4 of the memory 904 by the operation shown in the time chart of FIG. 19.

As stated above, a reference timing cycle of "1" is assigned to the input register RIA, and one of "3" to the input register RIB. The output register ROR1 selects and enters an output datum of the input register RIA when the reference timing cycle is "1"; stores it when the cycle is "2"; selects and enters an output datum of the input register RIB while holding the preceding datum when the cycle is "3"; stores it when the cycle is "4"; select and enters another output datum of the input register RIA while holding the preceding datum when the cycle is again "1"; stores it when the cycle is again "2", ......, and repeats these same operations in the four timing cycles. As also described above, the output register ROR2 operates in the same manner as the output register ROR1 except that the former is one timing cycle behind the latter. Thus, it repeats in four timing cycles the operations of selecting and entering an output datum of the input register RIA, storing it at the next timing when the reference timing cycle is "2", selecting and entering an output datum of the input register RIB, and storing it at the next timing when the reference timing cycle is "4". The output register ROR3 operates in the same manner as the output register ROR2 except that the former is another timing cycle behind the latter, and this correspondingly applies to the output register ROR4.

As a result of these operations, as shown in FIG. 19, the datum $a_2$ stored into the input register RIA at timing t5 is stored into the output register ROR1 at timing t6 when the reference timing cycle is "1", the datum $a_5$ stored into the input register RIA at timing t10 is stored into the output register ROR2 at timing t11 when the reference timing cycle is "2", and the data $a_6$ and $b_3$ stored into the input registers RIA and RIB at timing t11 are stored into the output registers ROR3 and ROR1, respectively, at timing t12 when the reference timing cycle is "3". Similar operations are repeated thereafter, and the data $a_2$, $b_3$, $b_8$, $a_{13}$, ... are entered in the bank BANK1 of the memory via the output register ROR1, the data $a_5$, $b_4$, ... are entered into the bank BANK2 of the memory via the output register ROR2, the data $a_6$, $b_5$, ... are entered into the bank BANK3 of the memory via the output register ROR3, and the data $a_{10}$, $b_7$, ... are entered into the bank BANK4 of the memory via the output register ROR4.

To consider here a data series D (=$d_1$, $d_2$, $d_3$, $d_4$, $d_5$, ... =$a_2$, $a_5$, $a_6$, $a_{10}$, $a_{13}$, ...) comprising only valid data from the data series A (=$a_1$, $a_2$, $a_3$, ...) and a data series F (=$f_1$, $f_2$, $f_3$, $f_4$, $f_5$, ... =$b_3$, $b_4$, $b_5$, $b_7$, $b_8$, ...) comprising only valid data from the data series B (=$b_1$, $b_2$, $b_3$, ...), it is seen that the $4 \times k + 1$-th (k is an integer) data $d_1$ (=$a_2$), $f_1$ (=$b_3$), $d_5$ (=$a_{13}$), $f_5$ (=$b_8$), ... of the data series D and F are entered into the bank BANK1 of the memory; the $4 \times k + 2$-th data $d_2$ (=$a_5$), $f_2$ (=$b_4$), ... of the data series D and F, into the bank BANK2 of the memory; the $4 \times k + 3$-th data $d_3$ (=$a_6$), $f_3$ (=$b_5$), ... of the data series D and F, into the bank BANK3 of the memory; and the $4 \times k + 4$-th data $d_4$ (=$a_{10}$), $f_4$ (=$b_7$), ... of the data series D and F, into the bank BANK4 of the memory.

Thus it is seen that the pipeline circuit according to the present invention is effective for adjusting the timing to supply data to an interleave type processing apparatus in a sequence for valid data alone, even if the input data include invalid data.

Figure 20:
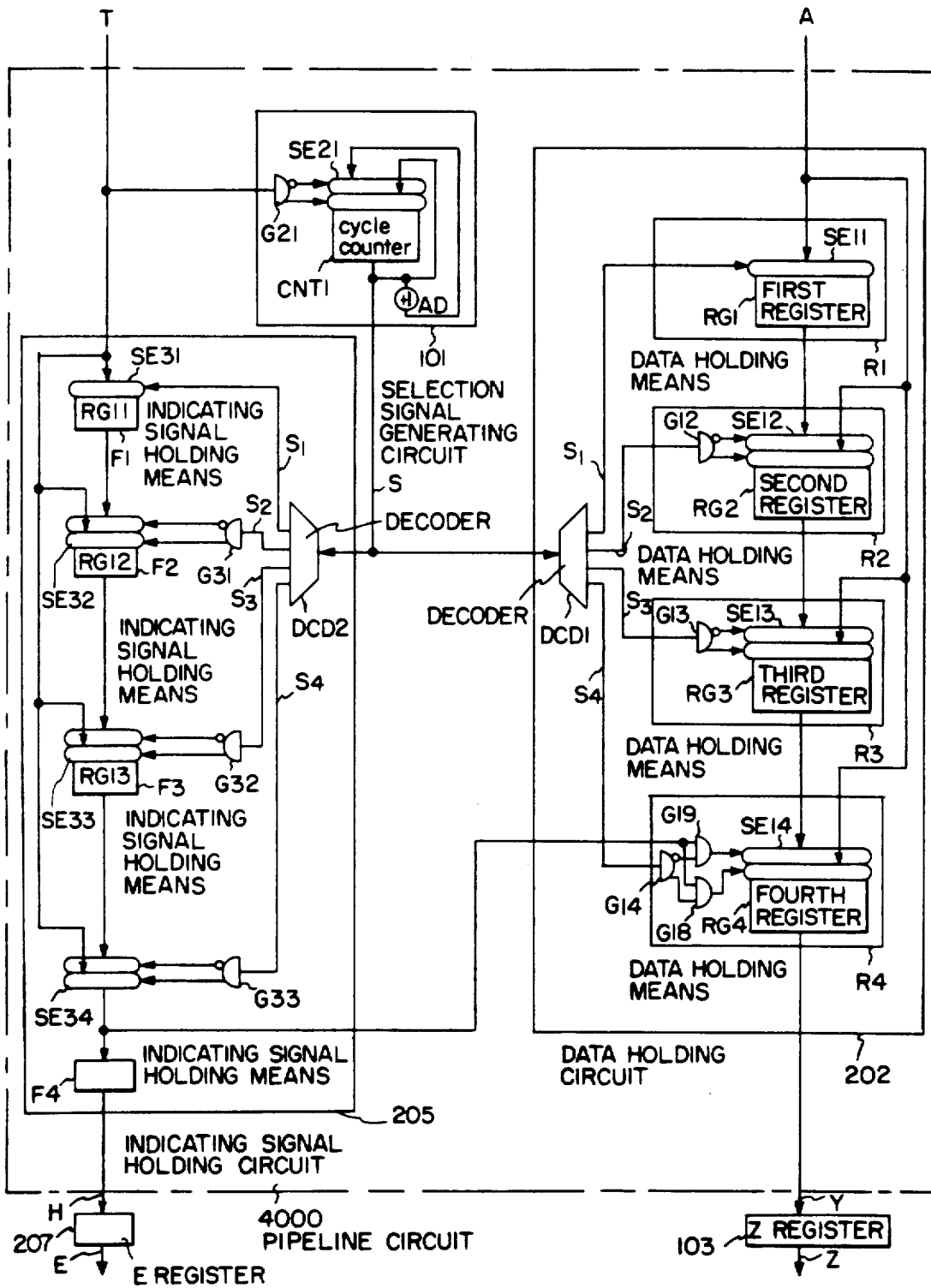
FIG. 20 is a block diagram of a seventh preferred embodiment of the invention.

FIG. 20 is a block diagram of a seventh preferred embodiment of the present invention, where the advantage of the pipeline circuit according to the invention is increased by supplying the output indicating signal H in addition to the output data Y, as referred to in the sixth embodiment shown in FIG. 16. In FIG. 20, the same reference numerals as in FIG. 16 denote respectively the same constituent elements, respectively.

Referring to FIG. 20, an indicating signal holding circuit 205 receives the inputting of the selection signal S from a selection signal generating circuit 201, generates from it, with a decoder DCD2, selection signals $S_1$, $S_2$, $S_3$, and $S_4$ for four stages of indicating signal holding means F1, F2, F3 and F4, respectively, and stores the input indicating signal T into one of the four-stage indicating signal holding means F1, F2, F3 and F4. If the selection signal $S_3$, for instance, out of the selection signals $S_1$, $S_2$, $S_3$ and $S_4$ is valid, the input indicating signal T is stored into the indicating signal holding means F3. The input indicating signal T stored into the indicating signal holding means F3 is supplied one timing cycle later as the output indicating signal V, at the same time entered into the indicating signal holding means F4, and stored and outputted another timing cycle later.

If the selection signal S4 out of the selection signals $S_1$, $S_2$, $S_3$ and $S_4$ is valid, the input indicating signal T will be directly supplied as the output indicating signal V from a selecting circuit SE34, then entered into the indicating signal holding means F4, and finally stored and outputted one timing cycle later.

The output of the indicating signal holding means F4 is supplied as the output data H of the pipeline circuit 4000, stored into an E register 207 and, together with the output Z of a Z register 204, handed over to a succeeding circuit. Since the data Y outputted from the data holding circuit 202 at a timing at which the output data H are valid (logical "1" for example are always valid), the data H, i.e. the output E of the E register 207, can be used as a control signal (for instance a write enable signal or the like) for the output Z of the Z register 204 in a circuit downstream.

Other parts of the pipeline circuit 4000 are equivalent to those of the pipeline circuit 2000 of FIG. 16.

Figure 21:
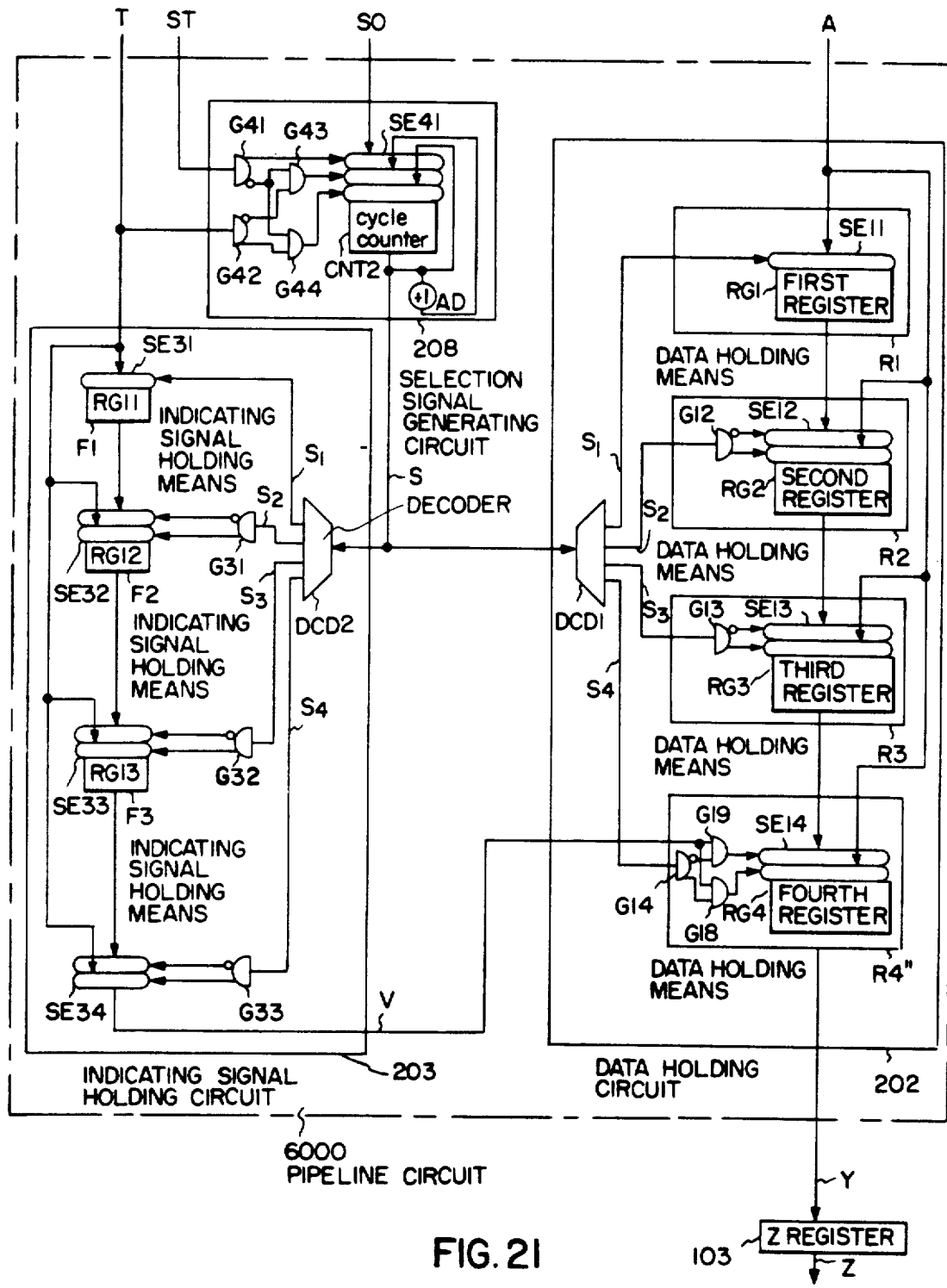
FIG. 21 is a block diagram of a eighth preferred embodiment of the invention.

FIG. 21 is a block diagram of an eighth preferred embodiment of the present invention, where the advantage of the pipeline circuit according to the invention is increased by inputting not only the input data series A and the input indicating signals T, as referred to in the sixth embodiment shown in FIG. 16, but also a selection signal initial value SO and an initial value setting indicating signal ST. Equivalent constituent elements to those in FIG. 16 are denoted by the same reference numerals respectively.

Referring to FIG. 21, a selection signal generating circuit 208, having the selection signal initial value SO, the initial value setting indicating signal ST and the input indicating signal T as inputs, outputs the selection signal initial value SO as the selection signal S for the next timing when the initial value setting indicating signal ST indicates validity; generates and outputs the selection signal indicating the value next to what was indicated by the preceding selection signal S out of the four periodic values 1, 2, 3, 4, 1, 2, . . . when both the initial value setting indicating signal ST and the input indicating signal T indicate invalidity; and holds the value indicated by the preceding selection signal S when the initial value setting indicating signal ST and the input indicating signal T indicate invalidity and validity respectively.

The selection signal generating circuit 208 referred to above, as illustrated, can be realized with a cycle counter CNT2 having a three-input one-output selecting circuit SE41 to whose first, second and third stage inputs are supplied the selection signal initial value SO, the output of a +1 circuit AD and the current value of the selection signal S respectively; a gate G41 which provides the initial value setting indicating signal ST to the first stage of the selecting circuit SE41 and at the same time generates its inverted signal; a gate G42 which outputs the input indicating signal T and its inverted signal; a gate G43 which provides the logical product of the inverted signal of the initial value setting indicating signal ST and that of the input indicating signal T to the second stage of the selecting circuit SE41; and a gate G44 which provides the logical product of the inverted signal o the initial value setting indicating signal ST and the input indicating signal T to the third stage of the selecting circuit SE41. This cycle counter CNT2 varies the value of the selection signal in synchronism with the timing cycle by selecting the value of the selection signal initial value SO when the initial value setting indicating signal ST indicates "1", the value "S+1" when both the initial value setting indicating signal ST and the input indicating signal T indicate "0", or the value "S" when the initial value setting indicating signal ST indicates "0" and the input indicating signal T indicates "1". This selection signal S can indicate one of four values, 1, 2, 3 and 4.

Other parts of the pipeline circuit 6000 are equivalent to those of the pipeline circuit 2000 of FIG. 16.

The pipeline circuit 6000 described above, if used, for instance, as the pipeline circuit 902 described with reference to FIGS. 18 and 8, can adjust the timing of the selecting signal S, so that the first valid datum can be stored into the input register RIB when the crossbar reference timing is "3", by inputting a value one timing cycle behind the crossbar reference timing as the selection signal initial value SO together with the initial value setting indicating signal ST.

BENEFITS OF THE INVENTION

As hitherto described, the pipeline circuit of the present invention offers the benefits that, even if data input timings are irregular or the data are both valid and invalid, valid data alone can be sent out at appropriate timings by controlling the generation of selection signals using a signal indicating the validity or invalidity of input data for determining the duration of data holding within the pipeline circuit. The circuit for said control can be realized with simple and small hardware.

What is claimed is:

1. A pipeline circuit for determining a data holding duration in said circuit based on the validity or invalidity of data, comprising:

(a) a selection signal generating means for generating a selection signal $S_j$ in response to an input indicating signal $T_j$ for every corresponding input data $A_j$, $J = 1, \ldots m$, where m is an integer, said input indicating signal $T_j$ having a first state indicating validity and a second state indicating invalidity of said input data $A_j$, (b) a data holding circuit including a plurality of data holding means $R_1 \ldots R_n$, n being an integer, connected in a pipelined manner for storing at least some of said input data $A_j$, and for transferring valid data stored in one of said data holding means $R_p$, to a next one of said data holding means in series to $R_{p+1}, \ldots R_n$, (c) wherein said selection signal generating means is operative when said input indicating signal $T_j$ indicates validity of said corresponding input data $A_j$ for maintaining said selection signal $S_j$ at a value of a previous selection signal $S_{j-1}$, and operative when said input indicating signal $T_j$ indicates invalidity of said corresponding input data $A_j$ for indicating a value of said selection signal $S_j$ equal to the next value in a periodic set of values 1, 2, . . . n, 1, 2, . . . following a value equal to said value of said previous selection signal $S_{j-1}$.

2. A pipeline circuit as recited in claim (1), wherein said m input indicating signal $T_j$ is further inputted into said data holding circuit and said data holding means $R_j$ store said input indicating signal $T_j$ with said corresponding input data $A_j$ and, said data holding circuit simultaneously outputs said input indicating signal $T_j$ and said corresponding input data $A_j$.

3. A pipeline circuit as in claim (1), wherein said selection signal generating means receives a selection signal initial value S0, and an initial value setting indicating signal $ST_j$, where if V means validity and I means invalidity then the following holds,

| $T_j$ | $ST_j$ | $S_j$ |
|---|---|---|
| V | V | SO |
| V | I | $S_{j-1}$ |
| I | V | SO |
| I | I | $S_{j-1} \pm 1$ |

4. A pipeline circuit as described in claim (1), wherein said input indicating signal $T_j$ is inputted to each of said data holding means $R_i$.

5. A pipeline circuit as described in claim (1), which further includes, an indicating means holding circuit with n−1 stages of indicating signal holding means $F_j$, which has said input indicating signal $T_j$ and said selection signal $S_j$ as inputs and which outputs an output indicating signal $V_j$, with m values $V_1, V_2, \ldots, V_m$, where, if said selection signal $S_j$ is n, then $V_j = T_j$, and, if said selection signal $S_j$ is i<n, then said input indicating signal $T_j$ is stored in said indicating signal holding means $F_j$ and outputted via $n-i-1$ stages of said indicating signal holding means $F_{i-1}, F_{i-2}, \ldots, F_{n-1}$ as the output indicating signal $V_j$, $n-i$ timing cycles later than the inputting of said input indicating signal $T_j$, and wherein, said data holding circuit receives said output indicating signal $V_j$ and is operative in response thereto such that

- if said selection signal $S_j$ is i(i<n) and if said output indicating signal $V_j$ indicates validity or invalidity then said corresponding input data $A_j$ is outputted via $n-i-1$ stages of said data holding means $R_{i+1}$, $R_{i+2}, \ldots, R_n$, $n-i$ timing cycles later,
- if said selection signal $S_j$ is n and if said output indicting signal $V_j$ indicates validity, then said corresponding input data $A_j$ is stored in said data holding means $R_n$ and is outputted one timing cycle later, and
- if said selection signal, $S_j$ is n and if said output indicating signal $V_j$ indicates invalidity, then said corresponding input data $A_j$ is not stored in said data holding means $R_n$.

6. A pipeline circuit as described in claim 5, wherein said indicating signal holding circuit has an additional indicating signal holding means $F_n$, which outputs a signal $H_j$ corresponding to said input data $A_j$ indicating the validity or invalidity of said input data $A_j$ as said input data $A_j$ is outputted from said data holding circuit.

7. A pipeline circuit as in claim 5, wherein a selection signal initial value SO, and an initial value setting indicating signal $ST_j$ are inputted to said selection signal generating means where,

- if said input indicating signal $T_j$ and said initial value indicating signal $ST_j$ indicate invalidity, then said selection signal $S_j = S_{j-1} \pm 1$ and if said input indicating signal $T_j$ indicates validity, and said initial value setting indicating signal $ST_j$ indicates invalidity, then said $S_j = S_{j-1}$, and
- if said input indicating signal $T_j$ indicates invalidity and said initial value setting indicating signal $ST_j$ indicates validity, then said $S_j$ equals said initial value SO,
- if said initial value setting indicating signal $ST_j$ and said input indicating signal $T_j$ indicate validity, then said selection signal $S_j$ is said initial value SO.

8. A pipeline circuit as described in claim (7), wherein said indicating signal holding circuit has an additional indicating signal holding means $F_n$, which outputs a signal $H_j$ corresponding to said input data $A_j$ indicating the validity or invalidity of said input data $A_j$ as said input data $A_j$ is output from said data holding circuit.

9. A pipeline circuit for determining a data holding duration in said circuit based on the validity or invalidity of data, comprising:

- a selection signal generating circuit for outputting a selection signal $S_j$ indicating a value, said value indicated by said selection signal $S_j$ being equal to a next value in a periodic sequence of n values (1, 2, ... n, 1, 2, ... ) following the value in said periodic sequence which was indicated by a preceding selection signal $S_{j-1}$ when an input indicating signal $T_j$, corresponding to one datum $A_j$ out of a series of m input data $A_1, A_2, \ldots, A_m$ indicates invalidity, and, said value indicated by said selection signal $S_j$ being equal to the same value as that indicated by said preceding selection signal $S_{j-1}$ when said input indicating signal $T_j$ indicates validity; and
- a data holding circuit including a plurality of data holding means $R_1 \ldots R_n$ (where n is an integer) connected in a pipelined manner, said data holding circuit coupled to said selection signal generating circuit such that said datum $A_j$ is inputted into a data holding means $R_i$ of said data holding means, the i-th among n stages of data holding means $R_1$, $R_2, \ldots, R_n$ when said value indicated by said selection signal $S_j$ generated by said selection signal generating circuit is i, and outputting via $n-i$ stage of data holding means $R_{i+1}$, $R_{i+2}, \ldots, R_n$ of said data holding means the datum $A_j$, $n-i+1$ (where i>n, n is an integer) timing cycles later than the inputting of the data $A_j$ where said m input data $A_1, A_2, \ldots, A_j, \ldots, A_m$ and said m input indicating signals $T_1, T_2, \ldots, T_j, \ldots, T_m$ are entered, and where valid data among said m input data are successively outputted at $n \times k + 1$ (k is an integer) timing cycles.

10. A pipeline circuit, as claimed in claim 9, wherein the same units of information as said m input indicating signals $T_1, T_2, \ldots, T_m$ are entered into said data holding circuit as part of said m input data $A_1, A_2, \ldots, A_m$.

11. A pipeline circuit for determining a data holding duration in said circuit based on the validity or invalidity of data, comprising:

- a selection signal generating circuit for outputting a selection signal $S_j$ indicating a value, said value indicated by said selection signal $S_j$ being equal to a next value in a periodic sequence of n values (1, 2, ... n, 1, 2, ... ) following the value in said periodic sequence which was indicated by a preceding selection signal $S_{j-1}$ when an input indicating signal $T_j$, corresponding to one datum $A_j$ out of a series of m input data $A_1, A_2, \ldots, A_m$ indicates invalidity, and, said value indicated by said selection signal $S_j$ being equal to the same value as that indicated by said preceding selection signal $S_{j-1}$ when said input indicating signal $T_j$ indicates validity; and
- a data holding circuit including a plurality of data holding means $R_1 \ldots R_n$ (where n is an integer) connected in a pipelined, having as inputs said datum $A_j$, said data holding circuit coupled to said selection signal generating circuit such that said selection $S_j$ corresponding to said datum $A_j$ and said input indicating signal $T_j$, which, if said value indicated by said selecting signal $S_j$ is i, inputs said datum $A_j$ and said input indicating signal $T_j$ into a data holding means $R_i$ of said data holding means, the i-th among n stages of data holding means $R_1$, $R_2, \ldots, R_n$, and which outputs, via $n-i$ stages of data holding means $R_{i+1}, R_{i+2}, \ldots, R_n$ of said data holding means, the datum $A_j n-i+1$ (where i<n, n is an integer) timing cycles later than the inputting of the datum $A_j$, if said input indicating signal $T_j$ indicates validity, and invalidating said datum $A_j$ when said input indicating signal $T_j$ indicates invalidity where said m input data $A_1, A_2, \ldots, A_j, \ldots, A_m$ and said m input indicating signals $T_1, T_2, \ldots, T_j, \ldots, T_m$ respectively corresponding to said input data are entered, and where valid data among said input data are successively outputted at $n \times k + 1$ (k is an integer) timing cycles.

12. A pipeline circuit for determining a data holding duration in said circuit based on the validity or invalidity of data, comprising:

- a selection signal generating circuit for outputting a selection signal $S_j$ indicating a value, said value indicated by said selection signal $S_j$ being equal to a next value in a periodic sequence of n values (1, 2, ... n, 1, 2, ...) following the value in said periodic sequence which was indicated by a preceding selection signal $S_{j-1}$ when an input indicating signal $T_j$, corresponding to one datum $A_j$ out of a series of m input data $A_1, A_2, \ldots, A_m$ indicates invalidity, and, said value indicated by said selection signal $S_j$ being equal to the same value as that indicated by said preceding selection signal $S_{j-1}$ when said input indicating signal $T_j$ indicates validity; and an indicating signal holding circuit coupled to said selection signal generating circuit for outputting an output indicating signal $V_j = T_j$ when said value indicated by the selection signal $S_j$ from said selection signal generating circuit, corresponding to an inputting of said input indicating signal $T_j$, and said selection signal $S_j$ is i (i<n, n is an integer), said input indicating signal $T_j$ is inputted to indicating signal holding means $F_i$, the i-th among n−1 stages of said indicating holding means $F_1, F_2, \ldots, F_{n-1}$, and outputted via an n−i−1 stage of said indicating signal holding means $F_{i+1}, F_{i+2}, \ldots, F_{n-1}$ as the output indicating signal $V_j$, n−i timing cycles later than said inputting of said input indicating signal $T_j$; and a data holding circuit including a plurality of data holding means $R_1 \ldots R_n$ (where n is an integer) connected in a pipelined manner, coupled to said selection signal generating circuit and said indicating signal holding circuit for inputting said datum $A_j$ to data holding means $R_i$ of said data holding means, the i-th among n stages of data holding means $R_1, R_2, \ldots, R_n$, of said data holding means when said value indicated by said selection signal $S_j$ corresponding to said datum $A_j$, said selection signal $S_j$ and said output indicating signal $V_j$, are i (i<n), said data $A_j$ being conveyed as a datum P via an n−i−1 stage of said data holding means $R_{i+1}, R_{i+2}, \ldots, R_n$, n−i timing cycles later than said inputting of said datum $A_j$, but when said value indicated by said selection signal $S_j$ is n, conveying said datum $A_j$, as said datum P to said n-th data holding means $R_n$ and, when said output indicating signal $V_j$ indicates invalidity, invalidating the input to said n-th data holding means $R_n$ or, when said output indicating signal $V_j$ indicates validity, conveying said datum P to said n-th data holding means $R_n$ and outputting said datum P one timing cycle later where said m input data $A_1, A_2, \ldots, A_j, \ldots, A_m$ and said m input indicating signals $T_1, T_2, \ldots, T_j, \ldots, T_m$ respectively corresponding to said input data are entered, and where valid data among said m input data are successively outputted at $n \times k + 1$ (k is an integer) timing cycles.

* * * * *